US006688169B2

(12) United States Patent
Choe et al.

(10) Patent No.: US 6,688,169 B2
(45) Date of Patent: Feb. 10, 2004

(54) SYSTEMS AND METHODS FOR SENSING AN ACOUSTIC SIGNAL USING MICROELECTROMECHANICAL SYSTEMS TECHNOLOGY

(75) Inventors: Howard C. Choe, Andover, MA (US); Emel S. Bulat, Framingham, MA (US)

(73) Assignee: Textron Systems Corporation, Wilmington, MA (US)

( * ) Notice: Subject to any disclaimer, the term of this patent is extended or adjusted under 35 U.S.C. 154(b) by 0 days.

(21) Appl. No.: 09/881,793

(22) Filed: Jun. 15, 2001

(65) Prior Publication Data

US 2002/0191802 A1 Dec. 19, 2002

(51) Int. Cl.[7] .............................................. G01F 13/00

(52) U.S. Cl. .................... 73/170.13; 73/141 R; 73/720; 73/721

(58) Field of Search ................................ 257/414–421; 73/170.13, 514.18, 141 R, 517, 497, 766, 777, 720–721, 727, 204.26, 774; 430/320; 427/249, 255; 437/242, 244; 216/2

(56) References Cited

U.S. PATENT DOCUMENTS

| | | | | |
|---|---|---|---|---|
| 5,658,710 A | | 8/1997 | Neukermans | 430/320 |
| 5,659,195 A | | 8/1997 | Kaiser et al. | 257/415 |
| 5,883,310 A | | 3/1999 | Ho et al. | 73/766 |
| 6,031,273 A | | 2/2000 | Torok et al. | 257/421 |
| 6,128,961 A | | 10/2000 | Haronian | 73/774 |
| 6,243,474 B1 | * | 6/2001 | Tai et al. | 381/174 |

OTHER PUBLICATIONS

Low Flow–Noise Microphone for Active Noise Control Applications; R.S. McGuinn, G. C. Lauchle, D.C. Swanson; AIAA Journal; vol. 35; No. 1; Jan. 1997; pp. 29–34.

Active Removal of Wind Noise From Outdoor Microphones Using Local Velocity Measurements; Michael R. Shust; A Dissertation; 1998; 134 Pages.

Acoustical Society of America 136th Meeting Lay Language Papers; Electronic Removal of Outdoor Microphone Wind Noise; Michael R. Shust and James C. Rogers; Oct. 13, 1998; http://www.acoustics.org/136th/mshust.htm; Mar. 28, 2001; pp. 1–6.

International Search Report from International Application No. PCT/US 02/18969, filed Jun. 14, 2002, 6 pages.

Shust, Michael R. and Rogers, James C.: "Electronic Removal of Outdoor Microphone Wind Noise" Acoustical Society of America 136th Meeting Lay Language Papers, Oct. 1998.

Stephen, C. H. and Zanini, M.: "A Micromachined, Silicon Mass–Air–Flow Sensor for Auto–Flow Sensor for Automotive Applications" Transducers. San Francisco, Jun. 24–27, 1991.

(List continued on next page.)

*Primary Examiner*—Edward Lefkowitz
*Assistant Examiner*—Alandra Ellington
(74) *Attorney, Agent, or Firm*—David E. Huang, Esq.

(57) ABSTRACT

An acoustic system has an acoustic sensor and a processing circuit. The acoustic sensor includes a base, a microphone having a microphone diaphragm supported by the base, and a hot-wire anemometer having a set of hot-wire extending members supported by the base. The set of hot-wire extending members defines a plane which is substantially parallel to the microphone diaphragm. The processing circuit receives a sound and wind pressure signal from the microphone and a wind velocity signal from the hot-wire anemometer, and provides an output signal based on the sound and wind pressure signal from the microphone and the wind velocity signal from the hot-wire anemometer (e.g., accurate sound with wind noise removed). The configuration of the hot-wire extending members defining a plane which is substantially parallel to the microphone diaphragm can be easily implemented in a MEMS device making the configuration suitable for miniaturized applications.

25 Claims, 22 Drawing Sheets

OTHER PUBLICATIONS

McGuinn, R. S. and Lauchle, G. C.: "Low Flow–Noise Microphone for Active Noise Control Applications" AIAA Journal, vol. 35, No. 1, Jan. 1, 1997.

White Richard M.: Micro–Scale Mechanics for Sensors and Actuators: Proceedings of the Ultrasonics Symposium. Chicago, Oct. 2–5, 1988, New York, IEEE, US, Oct. 2, 1988.

GB 2 310 039 A (Roke Manor Research) Aug. 13, 1997, Abstract; figure 3.

Patent Abstract of Japan, vol. 1998, No. 05, Apr. 30, 1998 & JP 10 023590 A (Matsushita Electric Ind Co Ltd), Jan. 23, 1998, Abstract.

Patent Abstract of Japan, vol. 2000, No. 22, Mar. 9, 1998 & JP 2001 124621 A (Matsushita Electric Ind Co Ltd), May 11, 2001, Abstract.

Patent Abstract of Japan, vol. 005, No. 133, Aug. 25, 1981 & JP 56 069992 A (Sony Corp), Jun. 11, 1981, Abstract.

* cited by examiner

SYSTEMS AND METHODS FOR SENSING AN ACOUSTIC SIGNAL USING MICROELECTROMECHANICAL SYSTEMS TECHNOLOGY

BACKGROUND OF THE INVENTION

A microphone is a transducer that converts patterns of air pressure (i.e., an acoustic signal) into an electrical signal. In a typical dynamic microphone, a microphone diaphragm moves a coil relative to a magnetic field in order to cause current to flow within the coil. In a typical condenser microphone, a microphone diaphragm (e.g., a charged metallic plate, an electret, etc.) moves relative to a rigid backplate in order to cause current to flow from a power supply attempting to maintain a constant potential difference between the microphone diaphragm and the rigid backplate.

Wind noise can interfere with a microphone's ability to sense an acoustic signal. For example, when a person speaks into a microphone, wind noise can mask out the person's voice thus obscuring the person's voice from a device attached to the microphone (e.g., an amplifier, a recorder, a transmitter, a speaker, etc.). Wind noise can also mask out vital acoustic information reducing the performance of automated systems such as automatic object/target recognition devices, direction finding systems, etc.

Some microphone assemblies include windscreens that cover microphones in order to reduce wind noise sensed by the microphones. One conventional windscreen, which is typically seen on top of a microphone held by a television reporter, is made of foam and has a spherical shape (e.g., a foam ball which is approximately 10 centimeters in diameter covering the microphone). Such windscreens have been used for many years and can be effective in suppressing wind noise (e.g., an annoying rumbling sound) that could otherwise obscure particular sounds of interest (e.g., the television reporter's voice).

Some scientific experiments have attempted to electronically remove wind noise from sound and wind noise at a target location (e.g., to obtain an acoustic signature from a passing truck). In general, these experiments used a microphone for sensing sound and wind pressure, a set of hot-wire anemometers disposed around the microphone (e.g., a few millimeters from the microphone) for sensing wind velocity, and computerized equipment for storing and processing the sound and wind pressure sensed by the microphone and the wind velocity sensed by the set of hot-wire anemometers. A typical hot-wire anemometer is a fragile device that senses wind velocity by heating a short piece of wire (e.g., a 1.5 mm length of tungsten or platinum), and measuring the heat lost due to wind blowing past the wire (the heat or energy loss being directly related to the wind velocity).

One of the above-mentioned experiments occurred as follows. A first analog-to-digital (A/D) converter converted a signal from the microphone into a digitized sound and wind pressure signal which was stored in the memory of a computer. Simultaneously, a second A/D converter converted a signal from the set of hot-wire anemometers into a digitized heat-loss signal which was also stored in the memory. Next, a digital signal processor processed the sound and wind pressure signal and the heat-loss signal. In particular, an algorithm was applied to the heat-loss signal to generate wind pressure data, and the wind pressure data was subtracted from the sound and wind signal. Although the experiment provided mixed results, in theory the end result should have been a sound signal from the target location with wind noise removed.

An experiment along the lines mentioned above is described in an article entitled "Electronic Removal of Outdoor Microphone Wind Noise," by Shust et al., Acoustical Society of America $136^{th}$ Meeting Lay Language Papers, October, 1998, the teachings of which are hereby incorporated by reference in their entirety. Another experiment along similar lines is described in an article entitled "Low Flow-Noise Microphone for Active Noise Control Applications," by McGuinn et al., AIAA Journal, Vol. 35, No. 1, January, 1997, the teachings of which are hereby incorporated by reference in their entirety. Such experiments provided some encouraging test results, but only when the wind flow was substantially normal incident to the microphone diaphragm. A related experiment and wind signal algorithms (e.g., fluid dynamic equations) are described in a dissertation entitled "Active Removal of Wind Noise from Outdoor Microphones using Local Velocity Measurements," by Shust, Ph.D. Dissertation in Electrical Engineering, Michigan Technological University, Mar. 6, 1998, the teachings of which are hereby incorporated by reference in their entirety.

SUMMARY OF THE INVENTION

Unfortunately, there are deficiencies to conventional approaches to reducing wind noise sensed by a microphone. For example, the above-described conventional windscreens tend to be bulky thus hindering certain microphone applications (e.g., applications in hearing aids, hands-free telephone equipment, covert surveillance equipment, etc.). Additionally, the bulkiness of such windscreens hinders the current trend of microphone and acoustic system miniaturization (e.g., palm-sized camcorders, pocket-sized cellular telephones, etc.). Furthermore, windscreens cannot be miniaturized if their effectiveness in wind noise removal is to be maintained.

Additionally, in connection with the above-described conventional approach to electronically removing wind noise from a sound and wind pressure signal sensed by a microphone surrounded by a set of hot-wire anemometers, the approach provided mixed results and has not been shown to remove wind noise as effectively as windscreens. Such mixed results can be attributed to a number of factors. For example, the set of hot-wire anemometers did not sense wind noise from the same location as the microphone. Rather, the set of hot-wire anemometers sensed wind noise adjacent the microphone (i.e., a few millimeters away from the microphone) and such wind noise could have been significantly different than the wind noise at the microphone location. Also, as the wind passed the microphone toward the set of anemometers, the air flow around the microphone could have distorted the wind velocity at the anemometers thus introducing inaccuracies into the system. Furthermore, the approach worked well only when the wind was substantially normal incident to the microphone diaphragm.

Moreover, there are implementation deficiencies with the above-described conventional approaches to electronically removing wind noise. For example, some of the approaches required extensive computer equipment (e.g., multiple A/D converters, memory for storing signal information, the application of digital signal processing techniques to both a sound and wind pressure signal and a wind velocity signal, etc.). Furthermore, those approaches subtracted wind pressure data from a sound and wind signal after the signal information was digitized and stored in memory thus requiring computer memory and providing latency. Such post-processing approaches are unsuitable for certain applications such as in acoustic systems requiring active (i.e., real-time) wind noise removal, e.g., live broadcasts, cellular phones, military/defense ground sensors, hearing aids, etc.

In contrast to the above-described conventional wind noise reduction approaches, embodiments of the invention are directed to techniques for obtaining an acoustical signal using microelectromechanical systems (MEMS) technology. For example, sensing elements such as a microphone and a hot-wire anemometer can be essentially collocated (e.g., can reside at a location with a minute finite separation, or can be in contact with each other) in a MEMS device. Accordingly, wind velocity and sound and wind pressure can be measured at essentially the same location. As a result, an accurate wind pressure signal can be generated based on the wind velocity and then subtracted from the sound and wind pressure signal thus providing accurate sound with wind noise removed.

One arrangement of the invention is directed to an acoustic system having an acoustic sensor and a processing circuit. The acoustic sensor includes (i) a base, (ii) a microphone having a microphone diaphragm that is supported by the base, and (iii) a hot-wire anemometer having a set of hot-wire extending members that is supported by the base. The set of hot-wire extending members defines a plane which is substantially parallel to the microphone diaphragm. The processing circuit receives a sound and wind pressure signal from the microphone and a wind velocity signal from the hot-wire anemometer, and provides an output signal based on the sound and wind pressure signal from the microphone and the wind velocity signal from the hot-wire anemometer (e.g., accurate sound with wind noise removed). Since the hot-wire extending members define a plane which is substantially parallel to the microphone diaphragm, the hot-wire extending members and the microphone diaphragm can be positioned extremely close to each other (e.g., separated by a minute finite distance), or even in contact with each other, for accurate wind velocity and sound and wind pressure sensing at the same location.

In one arrangement, a first layer of conductive material defines the microphone diaphragm (e.g., polycrystalline silicon, silicide, etc.), and a second layer of conductive material defines the set of hot-wire extending members (e.g., tungsten). In this arrangement, the base includes a substrate (e.g., silicon) that supports both the first layer of conductive material and the second layer of conductive material. Accordingly, the acoustic sensor can be implemented as a MEMS device. Since such a MEMS acoustic sensor is capable of providing sound with wind noise removed, the MEMS acoustic sensor can be conveniently referred to as a MEMS Electronic Windscreen Microphone (MEWM).

In one arrangement, the microphone of the acoustic sensor further includes a rigid member (e.g., a backplate) that is substantially parallel to the microphone diaphragm to form a condenser microphone cavity. In this arrangement, a third layer of conductive material defines the rigid member of the microphone. The substrate supports the third layer of conductive material. Preferably, the microphone diaphragm extends in a contiguous manner to the base to form a seal between the set of hot-wire extending members and the condenser microphone cavity. Accordingly, the microphone diaphragm will prevent contaminants (e.g., dust, moisture, dirt, debris, etc.) from traveling in a direction from the set of hot-wire extending members toward and into the condenser microphone cavity where it could otherwise cause the microphone to operate improperly.

In one arrangement, the set of hot-wire extending members includes tungsten bridges that are substantially parallel to each other within the plane defined by the set of hot-wire extending members. Accordingly, the tungsten bridges can be heated and the heat loss due to wind passing by the tungsten bridges can be measured (e.g., via analog circuitry) in order to obtain heat loss values which can be converted into wind velocity signal.

In one arrangement, the acoustic sensor further includes a layer of protective material (e.g., silicon nitride) supported by the substrate. The layer of protective material preferably defines a mesh such that sound waves are capable of passing from an external location to the set of hot-wire extending members and to the microphone diaphragm through the layer of protective material. Accordingly, the mesh can allow sound and wind to pass from the external location to the anemometer and to the microphone, but also reduces the likelihood of contaminants reaching the anemometer and the microphone.

In one arrangement, the first layer of conductive material defines multiple microphone diaphragms including the microphone diaphragm. Preferably, the multiple microphone diaphragms are configured into a two-dimensional N×M array of microphone diaphragms (N and M being positive integers). Additionally, a second layer of conductive material defines multiple sets of hot-wire extending members including the set of hot-wire extending members. Preferably, the multiple sets of hot-wire extending members are configured into a two-dimensional N×M array of sets of hot-wire extending members that corresponds to the two-dimensional N×M array of microphone diaphragms. Accordingly, the acoustic sensor can have multiple sensing elements (a microphone and anemometer pair) for robustness, e.g., for fault tolerance, an improved signal to noise ratio (i.e., to alleviate random noise at any particular sensing element), etc.

In one arrangement, the two-dimensional N×M array of microphone diaphragms includes a first row of microphone diaphragms configured to respond to sound waves within a first frequency range (e.g., 0–10 Khz), and a second row of microphone diaphragms configured to respond to sound waves within a second frequency range that is different than the first frequency range (e.g., 10–20 Khz). Other rows can respond to other frequency ranges as well. Accordingly, the acoustic sensor can be specifically tailored to sense particular types of sound (e.g., voice, automobile signatures, etc.).

In one arrangement, the processing circuit includes a conversion stage that converts the wind velocity signal from the hot-wire anemometer into an analog wind pressure signal having a wind pressure component, and an output stage that subtracts the wind pressure component of the analog wind pressure signal from the sound and wind pressure signal from the microphone to provide the output signal. This arrangement can operate in real-time in order to provide, as the output signal, a real-time sound signal with wind noise removed. Accordingly, this arrangement is suitable for real-time applications requiring active wind noise cancellation such as live broadcasts, cellular phones, military/defense ground sensors, hearing aids, etc.

In one arrangement, the conversion and output stages are analog circuits which reside in an application specific integrated circuit (ASIC). Such packaging enables the entire system to reside in a miniature space (e.g., a MEMS device for the acoustic sensor and an ASIC device for the processing circuit).

In one arrangement, the processing circuit includes a correlation stage that digitizes the wind velocity signal, correlates the digitized wind velocity signal with a series of wind pressure values from a lookup table, and provides the series of wind pressure values in the form of a correlation signal. Here, the processing circuit further includes an output stage that (i) receives the correlation signal from the correlation stage, (ii) receives the sound and wind signal from the microphone, and (iii) subtracts the series of wind pressure values from the sound and wind pressure signal to provide the output signal. This arrangement enables an algorithm to be applied to the wind velocity signal. In this arrangement, the system does not need the conversion stage, or the conversion stage can be bypassed.

The features of the invention, as described above, may be employed in acoustic systems, devices and methods and other electronic equipment such as those of Textron Systems Corporation of Wilmington, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for obtaining an acoustical signal using microelectromechanical systems (MEMS) technology. For example, sensing elements such as a microphone and a hot-wire anemometer can be essentially collocated (e.g., can reside at a location with a minute finite separation) in a MEMS device. Accordingly, wind velocity as well as sound and wind pressure can be measured at essentially the same location. As a result, a wind pressure signal can be generated based on the wind velocity at that location, and then subtracted from the sound and wind pressure obtained at that location thus providing accurate sound with wind noise removed.

Figure 1:
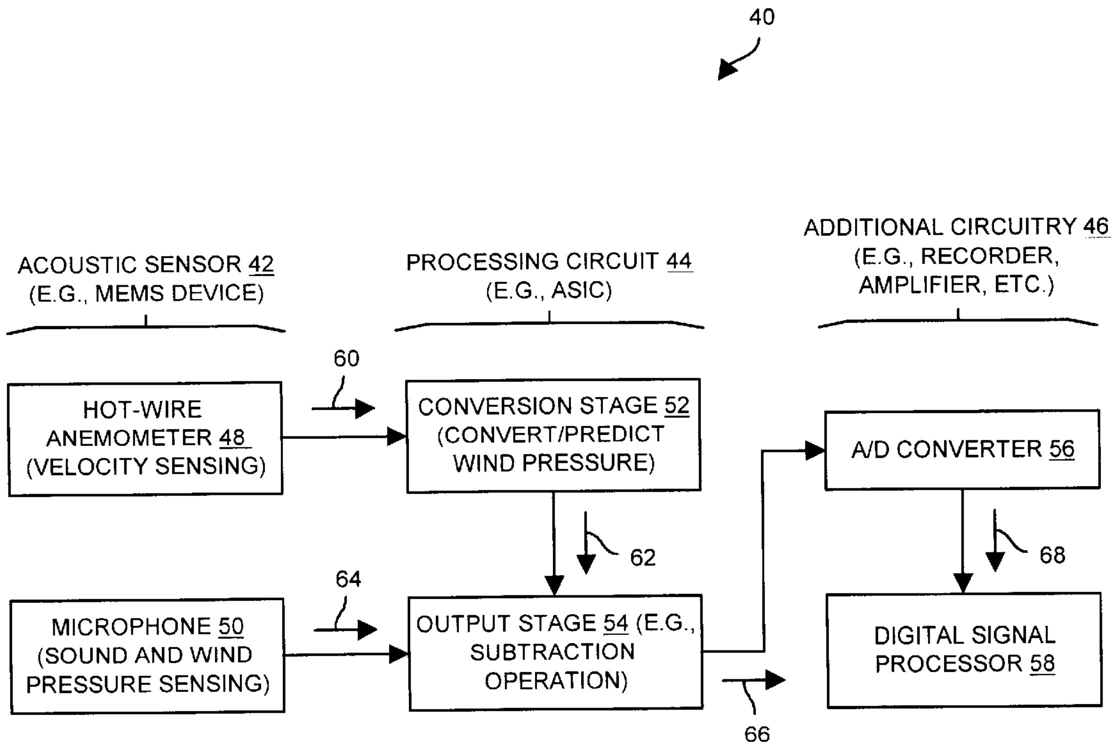
FIG. 1 is a block diagram of an acoustic system which is suitable for use by the invention.

FIG. 1 shows an acoustic system 40 which is suitable for use by the invention. The acoustic system 40 includes an acoustic sensor 42 and a processing circuit 44. The acoustic system 40 can further include additional circuitry 46 (e.g., a recorder, an amplifier, a transmitter, etc.). The acoustic sensor 42 includes a hot-wire anemometer 48 for sensing wind velocity and a microphone 50 for sensing sound and wind pressure. The processing circuit 44 includes a conversion stage 52 for converting wind velocity information into wind pressure information and an output stage 54 for providing sound information having wind noise removed. The acoustic system 40 actively removes non-stationary and non-linear wind noise that enters the microphone 50 without the need for conventional physical foam windscreens. By way of example only, the additional circuitry 46 includes an analog-to-digital (A/D) converter 56 and a digital signal processor 58 for further processing the sound information from the output stage 54.

Preferably, the acoustic sensor 42 is implemented as a MEMS device (i.e., a micromachined device). As such, the acoustic sensor 42 is suitable for use in miniaturized applications such as palm-sized camcorders, pocket-sized cellular telephones, covert surveillance equipment, etc. as well as non-miniaturized applications (e.g., hand-held microphones). Because the acoustic sensor 42 is capable of providing sound information with wind noise removed, the MEMS implementation of the acoustic sensor 42 can be conveniently referred to as a MEMS Electronic Windscreen Microphone (MEWM).

Additionally, the processing circuit 44 can be packaged in a single integrated circuit (IC) such as an application specific integrated circuit (ASIC). In one arrangement, the processing circuit 44 is exclusively analog circuitry within an ASIC thus alleviating the need for multiple A/D converters, i.e., the additional circuitry 46 can have a single A/D converter to digitize the information of the acoustic system 40 rather than multiple A/D converters for separately converting a wind velocity signal and a sound and wind pressure signal as in the earlier-described conventional scientific experiments. The combination of the acoustic sensor 42, which can be implemented as a MEMS device, and the analog circuitry results in wind noise free acoustics/sound from the output stage 54. In another arrangement, the processing circuit 44 is implemented as a hybrid circuit, i.e., in multiple IC packages mounted to a miniature circuit board.

During operation of the acoustic system 40, the acoustic system 40 converts raw physical wind velocity signals (i.e., wind/flow turbulence/velocity signals) into acoustic equivalent electrical signals for subtraction from an overall microphone signal containing both sound and wind pressure elements in order to obtain a clean sound signal with wind noise removed. In particular, the hot-wire anemometer 48 provides a wind velocity signal 60 (i.e., a heat loss signal) to the conversion stage 52. The conversion stage 52 converts the wind velocity signal 60 into a wind pressure signal 62, and outputs the wind pressure signal 62 to the output stage 54. The output stage 54 receives the wind pressure signal 62 from the conversion stage 52, concurrently receives a sound and wind pressure signal 64 from the microphone 50, and outputs an output signal 66 to the additional processing circuitry 46. The output signal 66 is based on the wind pressure signal 62 from the conversion stage 52 and the sound and wind pressure signal 64 from the microphone 50. In particular, the output signal 66 includes sound sensed by the microphone 50 with wind noise removed. In one arrangement, the output signal 66 is an analog signal which is converted into a digital signal 68 by the A/D converter 56 for further signal processing by the digital signal processor 58.

It should be understood that any delays between the sound and wind pressure signal 64 and the wind pressure signal 62 resulting from conversion of the wind velocity signal 60 can be compensated for by introducing a small delay in the sound and wind pressure signal 64. Such a delay can be implemented using longer conductors (e.g., longer conductive material runs, longer etch, and so on), delay buffers, etc. Further details of the invention will now be provided with reference to FIG. 2.

Figure 2:
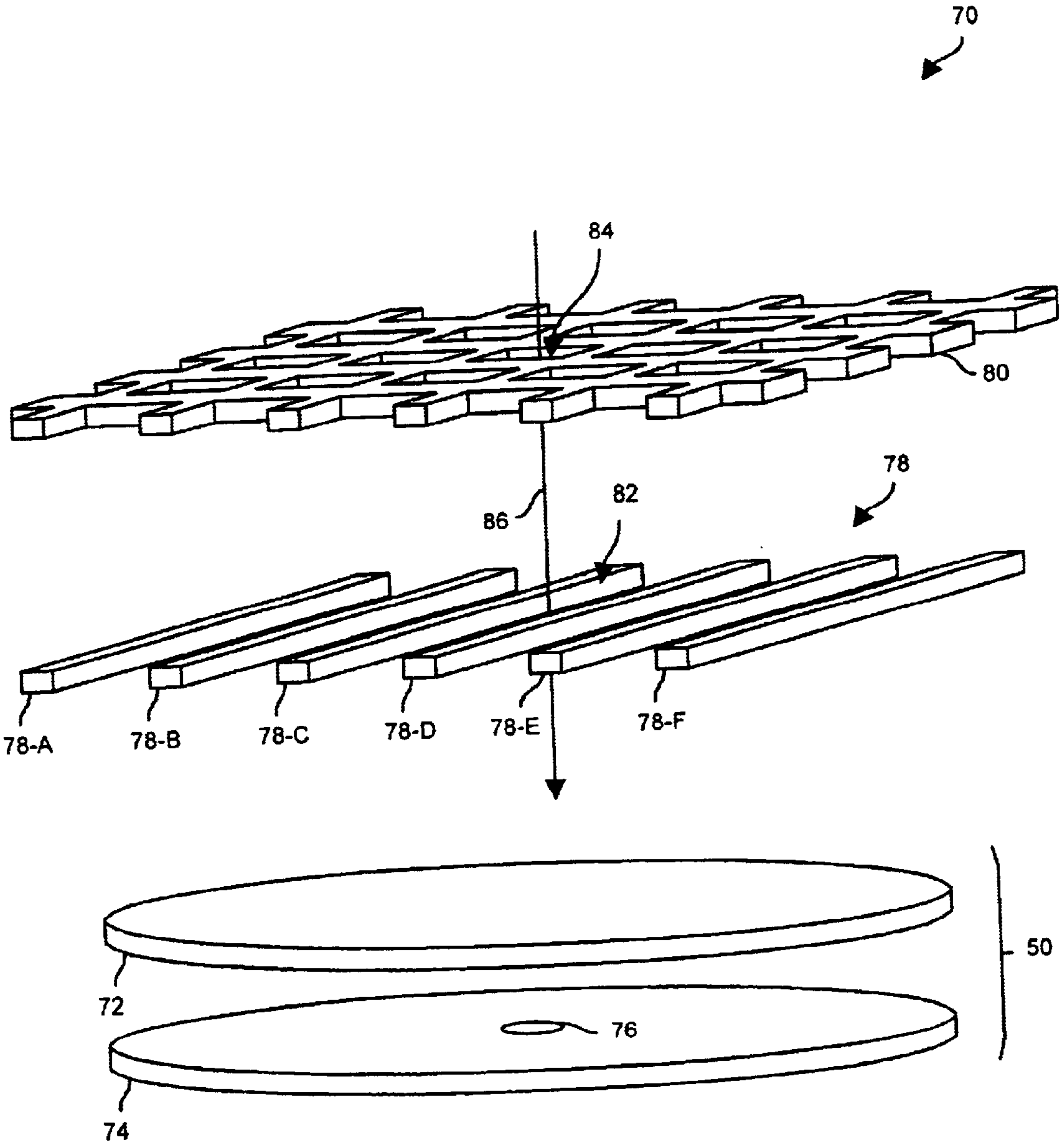
FIG. 2 is a perspective view of portions of an acoustic sensor of the acoustic system of FIG. 1.

FIG. 2 shows a perspective view of portions 70 of the acoustic sensor 42 of FIG. 1. The portions 70 include a microphone diaphragm 72 and a rigid member 74 (i.e., a rigid backplate) which form the microphone 50 (i.e., a condenser microphone). The rigid member 74 defines a hole 76. The portions 70 further include a set of hot-wire extending members 78-A, 78-B, 78-C, 78-D, 78-E, 78-F . . . (collectively, extending members 78) of the hot-wire anemometer 48. The set of hot-wire extending members 78 run in a substantially parallel manner to the microphone diaphragm 72. The portions 70 further include a layer of protective material 80 that defines a mesh (e.g., a grid of longitudinal and lateral runs). Gaps 82 between the hot-wire extending members 78 and holes 84 within the mesh of protective material 80 allow sound and wind 86 to pass therethrough and actuate the microphone 50. Further details of the invention will now be provided with reference to FIGS. 3 and 4.

Figure 3:
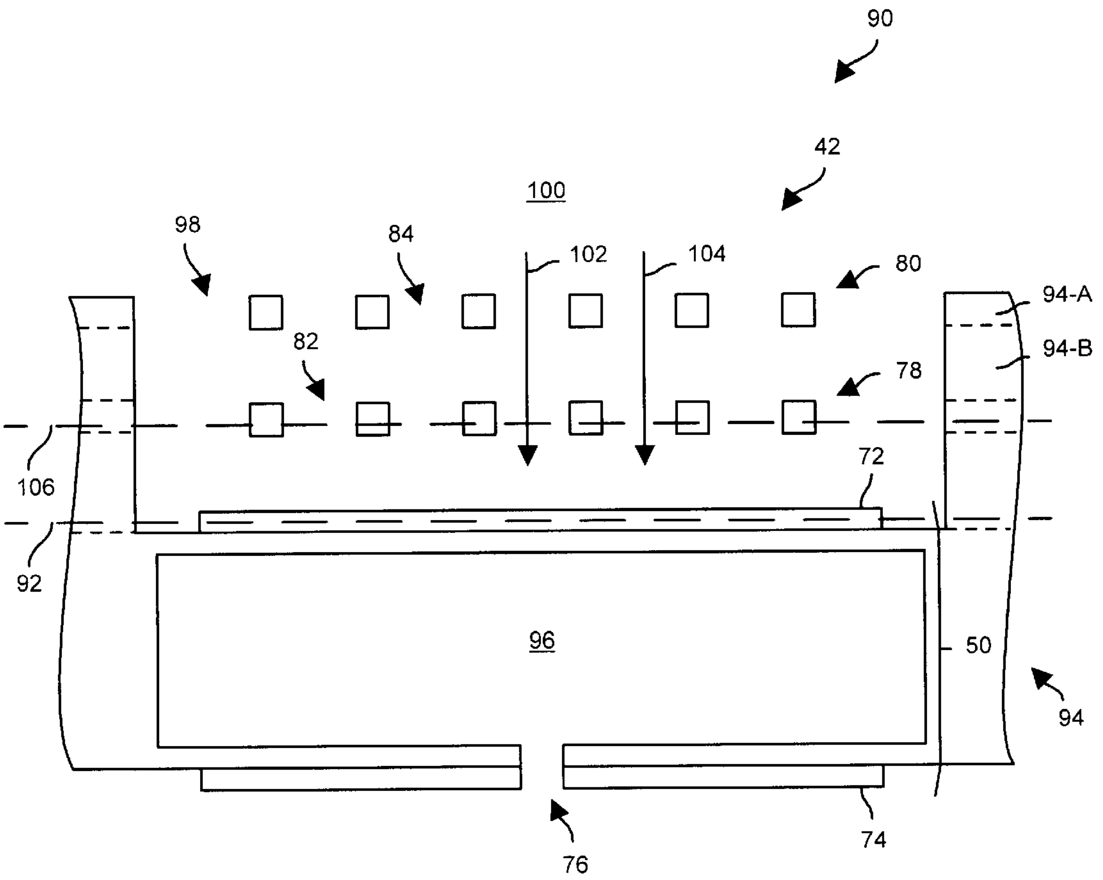
FIG. 3 is a cross-sectional side view of the acoustic sensor of FIG. 1 when implemented as a microelectromechanical system (MEMS) device.
Figure 4:
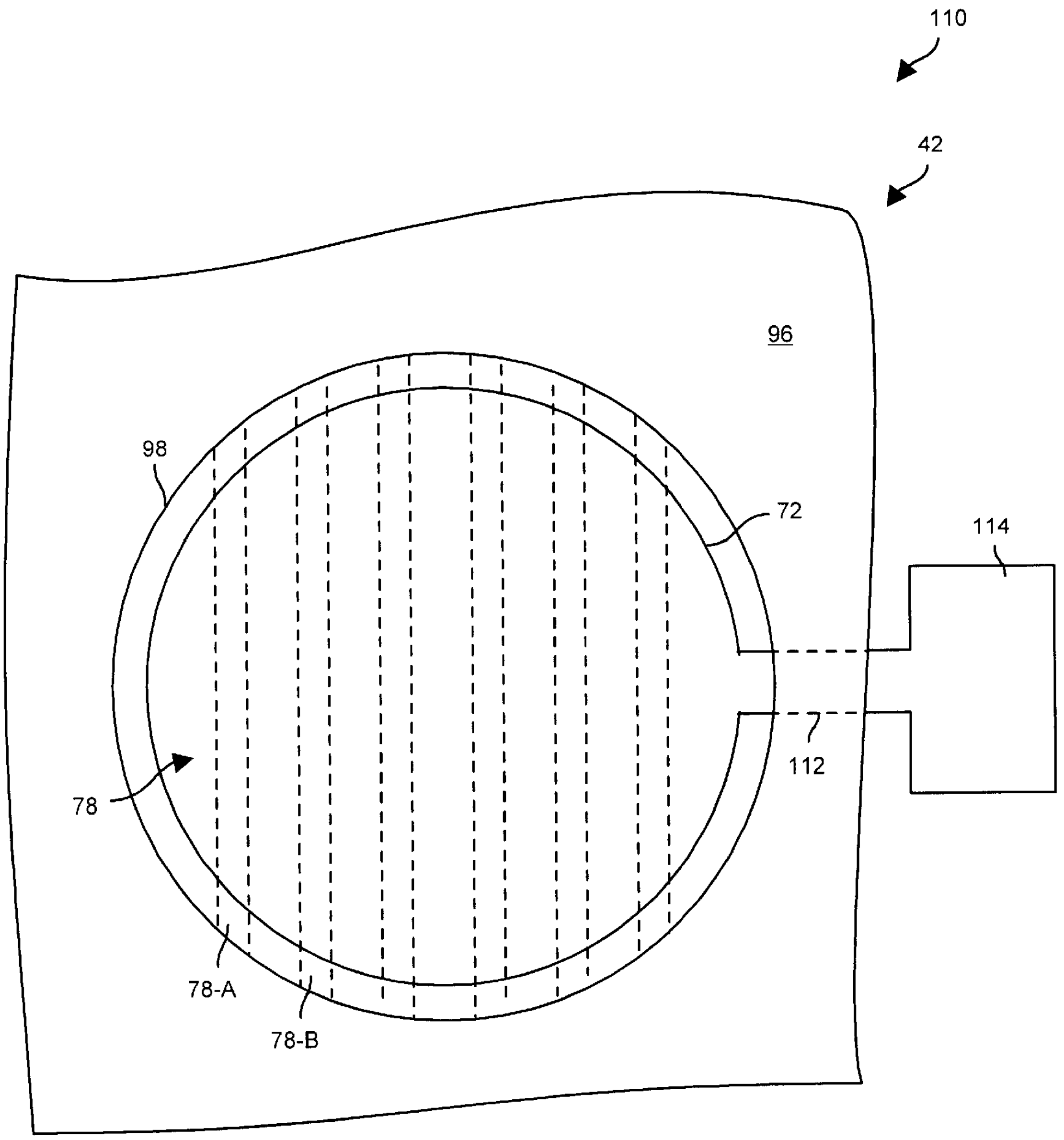
FIG. 4 is a top view of the acoustic sensor of FIG. 3.

FIGS. 3 and 4 respectively show a cross-sectional side view 90 of the acoustic sensor 42 of FIG. 1, and a top view 110 of the acoustic sensor 42 through a plane 92 of FIG. 3 (i.e., a plane 92 of the microphone diaphragm 72). As shown in FIGS. 3 and 4, the acoustic sensor 42 includes a base 94 that supports the microphone diaphragm 72 and the rigid member 74 (also see FIG. 2). In one arrangement, the acoustic sensor 42 is a MEMS device, and the base 94 is formed from multiple layers 94-A, 94-B, . . . of material (e.g., silicon, epitaxial silicon, low temperature silicon dioxide, plasma nitride, etc.). The base 94 further supports the hot-wire extending members 78 (shown as dashed lines in FIG. 4) and the mesh of protective material 80 (not shown in FIG. 4 for simplicity).

The base 94 defines a condenser microphone cavity 96 between the microphone diaphragm 72 and the rigid member 74, and an acoustic sensor opening 98 to an external location 100. The gaps 82 between the hot-wire extending members 78 and the holes 84 defined by the mesh of protective material 80 enable sound 102 and wind 104 to travel from the external location 100 to the microphone diaphragm 72. The hole 76 defined by the rigid member 74 allows air to move out of and back into the condenser microphone cavity 96 thus facilitating movement of the microphone diaphragm 72 relative to the rigid member 74 in response to the sound 102 and wind 104.

It should be understood that contaminants (e.g., dirt, moisture, dust, etc.) are prevented from entering the condenser microphone cavity 96 from the location 100 since the condenser microphone cavity 96 is preferably sealed by the microphone diaphragm 72. Additionally, contaminants can be prevented from entering the condenser microphone cavity 96 through the hole 76 (i.e., a breather) by device packaging of the acoustic sensor 42.

The microphone 50 operates as a condenser microphone. That is, as the microphone diaphragm 72 actuates, the distance between the microphone diaphragm 72 and the rigid member 74 changes. When a power supply provides a constant potential difference across the microphone diaphragm 72 and the rigid member 74, the movement of the microphone diaphragm can be detected as a change in current through the power supply wires leading to the microphone diaphragm 72 and the rigid member 74. By way of example only, FIG. 4 shows etch 112 and a pad 114 (i.e., a power supply wire) leading to the microphone diaphragm 72. A similar structure can be used to connect with the rigid member 74.

It should be understood that the set of hot-wire extending members 78 defines a plane 106 that is substantially parallel to the microphone diaphragm 72. Additionally, it should be understood that acoustic sensor 42 is preferably implemented as a micromachined device such that the set of hot-wire extending members 78 is essentially collocated with the microphone diaphragm 72, i.e., the hot-wire extending members 78 and the microphone diaphragm 72 are separated by a minute space (e.g., a few microns), or alternatively in contact with each other. Accordingly, the hot-wire anemometer 48 and the microphone 50 respectively sense wind velocity and sound and wind pressure at the same location. Additionally, due to this configuration, the acoustic sensor 42 is effective for all directions of sound and wind flow, not just for sound and wind flow which are substantially normal incident to the microphone diaphragm as in some scientific experiments. Further details of the invention will now be provided with reference to FIG. 5.

Figure 5:
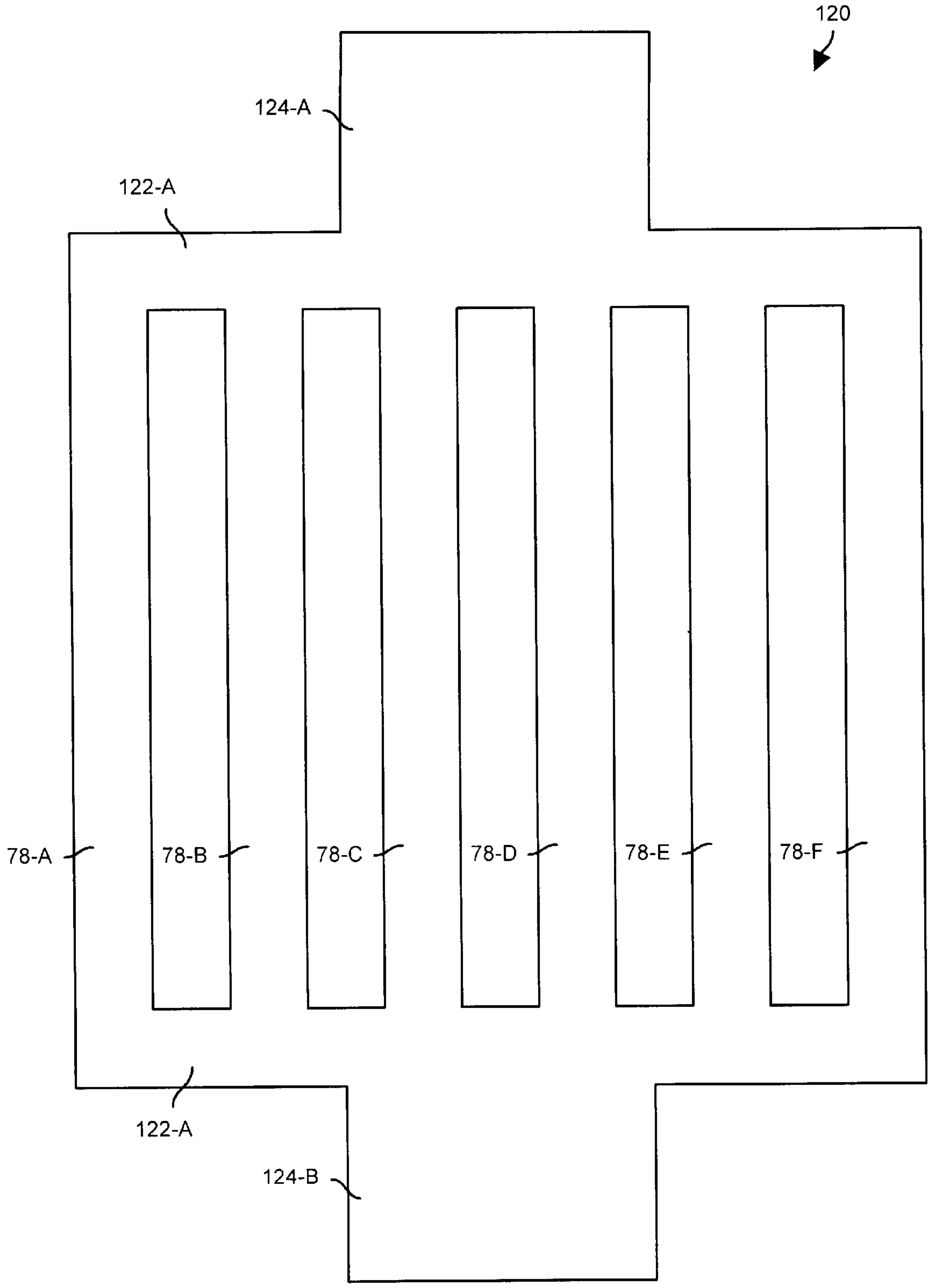
FIG. 5 is a top view of a hot-wire component for a hot-wire anemometer of the acoustic sensor of FIGS. 3 and 4.

FIG. 5 shows a top view of a hot-wire component 120 of the hot-wire anemometer 48. The hot-wire component 120 includes the set of hot-wire extending members 78 (also see FIGS. 2 through 4), a set of connecting members 122 and a set of pads 124. A connecting member 122-A connects ends of the hot-wire extending members 78 to a pad 124-A, and another connecting member 122-B connects other ends of the hot-wire extending members 78 to another pad 124-B. As mentioned earlier, the set of hot-wire extending members 78 is supported by the base 94 such that the extending members 78 define a plane 106 (see FIG. 3) which is substantially parallel to the microphone diaphragm 72.

During operation, the set of hot-wire extending members 78 (e.g., tungsten) heat up due to current flowing therethrough. Wind flowing through the hot-wire extending members 78 removes heat thus resulting in a change in the current, or voltage, through the hot-wire extending members 78 which is sensed by the processing circuit 44. Accordingly, the hot-wire extending members 78 provide an accurate indication of wind velocity which can be converted into a wind pressure signal. Further details of the invention will now be provided with reference to FIG. 6.

Figure 6:
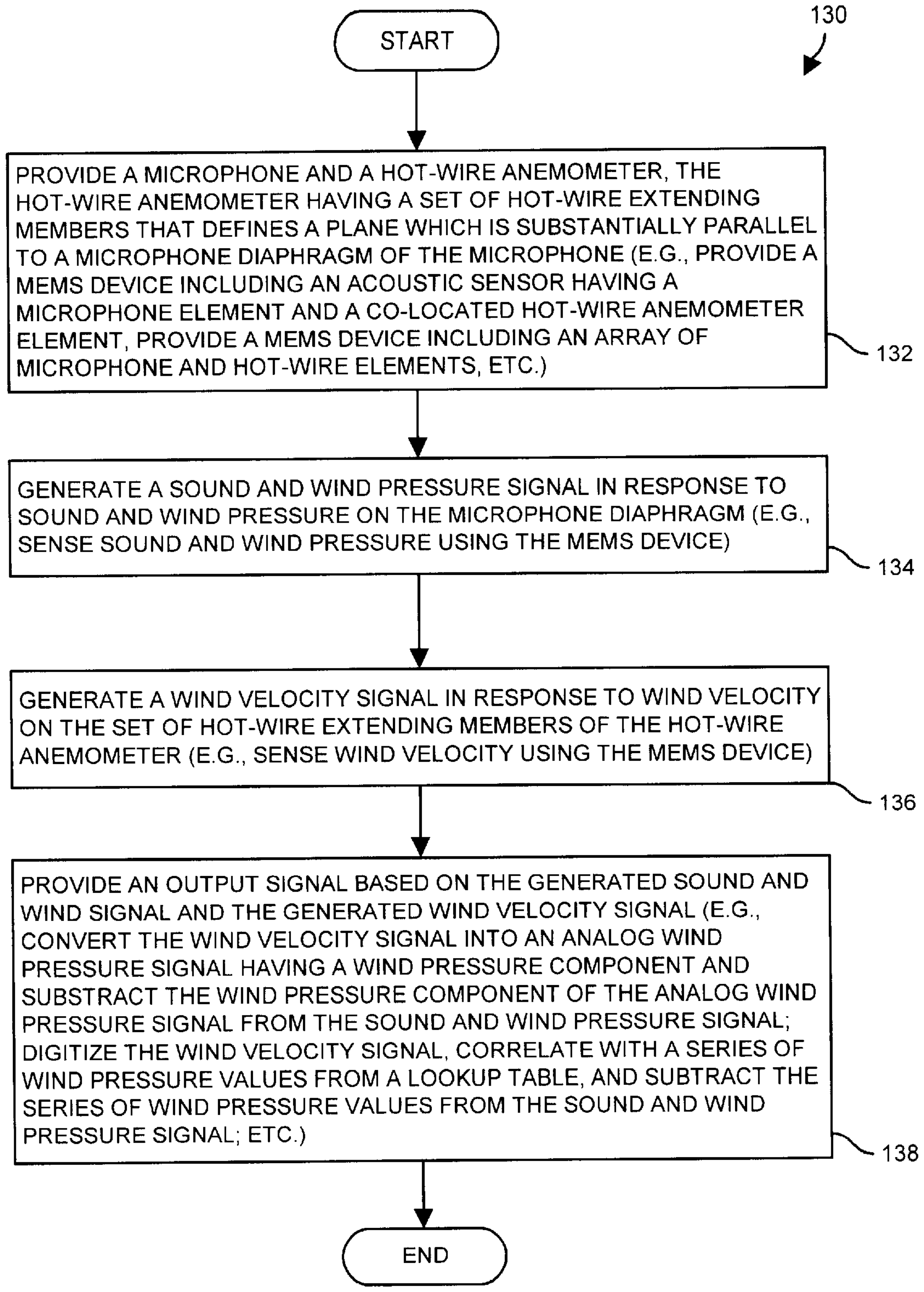
FIG. 6 is a flowchart of a procedure for using the acoustic system of FIG. 1.

FIG. 6 shows a procedure 130 for using the acoustic system 40 of FIG. 1. In step 132, the acoustic sensor 42 (also see FIGS. 3 and 4) is provided in order to detect sound and wind pressure, as well as wind velocity at a particular location. Recall that the acoustic sensor 42 includes the set of hot-wire extending members 78 that defines the plane 106 which is substantially parallel to the microphone diaphragm 72 thus enabling co-location of the hot-wire anemometer 48 and the microphone 50 (e.g., in a MEMS device).

In step 134, the microphone 50 of the acoustic sensor 42 generates a sound and wind pressure signal 64 (also see FIG. 1) in response to sound and wind pressure on the microphone diaphragm 72. In one arrangement, the microphone 50 generates a current signal as the sound and wind pressure signal 64. In another arrangement, the microphone 50 generates a voltage signal as the sound and wind pressure signal 64.

In step 136, the hot-wire anemometer 48 of the acoustic sensor 42 generates a wind velocity signal 60 in response to wind velocity on the set of hot-wire extending members 78. In one arrangement, the set of hot-wire extending members 78 includes a set of tungsten bridges which provides a current signal as the wind velocity signal 60 (i.e., a heat loss signal). In another arrangement, the anemometer 48 provides a voltage signal as the wind velocity signal 60. Preferably, steps 134 and 136 occur concurrently so that no delay, or minimal delay (e.g., using one or more delay buffers), of either the sound and wind pressure signal 64 and/or the wind velocity signal 62 is required.

In step 138, the processing circuit 44 provides an output signal 66 based on the sound and wind pressure signal 64 and the wind velocity signal 60. In particular, the conversion stage 52 of the processing circuit 44 converts the wind velocity signal 60 into an analog wind pressure signal 62 (i.e., a wind pressure current signal) having a wind pressure component. Then, the output stage 54 provides the output signal 66 based on the sound and wind pressure signal 64 from the microphone 50 and the analog wind pressure signal 62 from the conversion stage 52. For example, the output stage 54 subtracts the wind pressure component of the analog wind pressure signal 62 from the sound and wind pressure signal 64. The output signal 66 is thus sound sensed by the microphone 50 with wind noise removed. The output signal 66 can then be further processed by the additional circuitry 46 (e.g., filtered, amplified, digitized, stored, copied, transmitted, etc.). Further details of the invention will now be provided with reference to FIG. 7.

Figure 7:
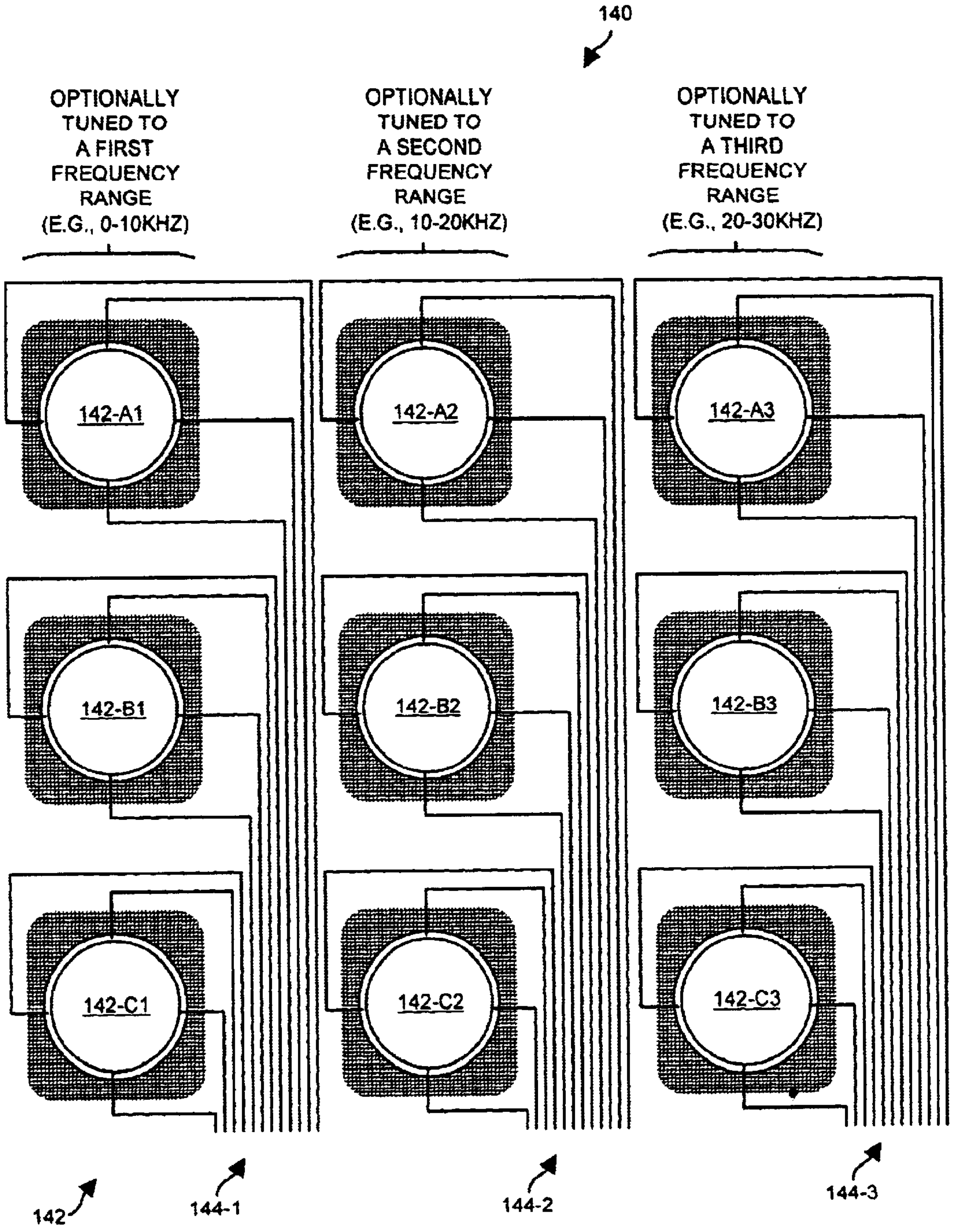
FIG. 7 is a top view of an acoustic sensor having an array of acoustic sensing elements.

It should be understood that the acoustic sensor 42 has been described thus far as including a single hot-wire anemometer 48 and a single microphone 50 by way of example only. In other arrangements, the acoustic sensor 42 includes multiple anemometer and microphone pairs. FIG. 7 shows a top view of an acoustic sensor 140 having multiple acoustic sensing elements 142 (see acoustic sensing elements 142-A1, 142-A2, 142-A3, 142-B1, 142-B2, 142-B3, 142-C1, 142-C2, 142-C3). Each acoustic sensing element 142 includes a hot-wire anemometer 48 and a microphone 50 which are collocated as illustrated above in FIGS. 3 and 4 (i.e., an anemometer/microphone pair). That is, the hot-wire anemometer 48 and the microphone 50 are essentially the collocated integration of sensing elements. In one arrangement, the hot-wire extending members 78 reside just above the microphone diaphragm 72 (e.g., at a minute finite separation of a few microns). In another arrangement, the hot-wire extending members 78 reside on top of (i.e., contact) the microphone diaphragm 72. Both arrangements provide for accurate measurement of wind velocity that is superior to conventional experiments which use one or more hot-wire anemometers that are millimeters (or even greater distances) away from the microphone.

Within the acoustic sensor 140, the acoustic sensing elements 142 are configured into an N×M array (N and M equaling three in FIG. 7 by way of example only). Accordingly, the acoustic sensor 140 is essentially a micro-acoustic sensor array.

If the acoustic sensor 140 is implemented in a micromachined device, the acoustic sensor 140 preferably includes conductor runs 144-1, 144-2, . . . (collectively conductors 144) which connect the hot-wire anemometers 48 and the microphones 50 of the acoustic sensing elements 142 to the processing circuit 44 (also see FIG. 1) in an organized manner. Recall that FIG. 4 illustrated a short conductor run 112 from the microphone diaphragm 72 to a pad 114. Preferably, similar but longer conductor runs 144 extend from the individual acoustic sensing elements 142 to pad locations outside the array 140 so that external wire leads (not shown for simplicity) can electrically connect the acoustic array 140 to the processing circuit 44. By way of example only, FIG. 7 shows the conductors 144 running from the acoustic sensing elements 142 in columns.

In one arrangement, the each acoustic sensing element 142 is tuned to a different specific frequency range. For example, a first acoustic sensing element 142 of the acoustic sensor 140 is tuned to a first frequency range of 0–10 Khz, a second acoustic sensing element 142 is tuned to a second frequency range of 10–20 Khz, and so on. This enables the acoustic sensor 140 to focus on particular frequency ranges for particular purposes (e.g., to sense for particular acoustic signatures, to cover a wider frequency range as a whole, etc.).

In another arrangement, the acoustic sensing elements 142 are grouped into sets, e.g., columns of elements 142, rows of elements 142, I×J blocks of elements 142 (I and J being positive integers), etc. Each set is tuned to receive sound and wind pressure in a different frequency range (e.g., a first frequency range of 0–10 Khz, a second frequency range of 10–20 Khz, etc.). Such tuning can be accomplished by changing one or more physical features (e.g., the mass, shape, size, thickness, etc.) of the acoustic sensing elements 142 from set to set. That is, the features of the microphone diaphragms 72 in a first set of acoustic sensing elements 142 can be adjusted so that it responds to a first frequency range, the features of the microphone diaphragms 72 of a second set of acoustic sensing elements 142 can be adjusted to respond to a second frequency range, and so on. By way of example only, the first column of acoustic sensing elements 142 in the acoustic sensor 140 of FIG. 7 is tuned to a first frequency range of 0–10 Khz, the second column of acoustic sensing elements 142 is tuned to a second frequency range of 10–20 Khz, and the third column of acoustic sensing elements 142 is tuned to a third frequency range of 20–30 Khz.

It should be understood that the acoustic sensor 140 provides a high level of robustness. For example, due to the micro scale of the acoustic sensing elements 142 and their multiplicity, there is better noise removal (i.e., a better signal-to-noise ratio), signal enhancement, fault tolerance, etc. Further details of the invention will now be provided with reference to FIG. 8.

Figure 8:
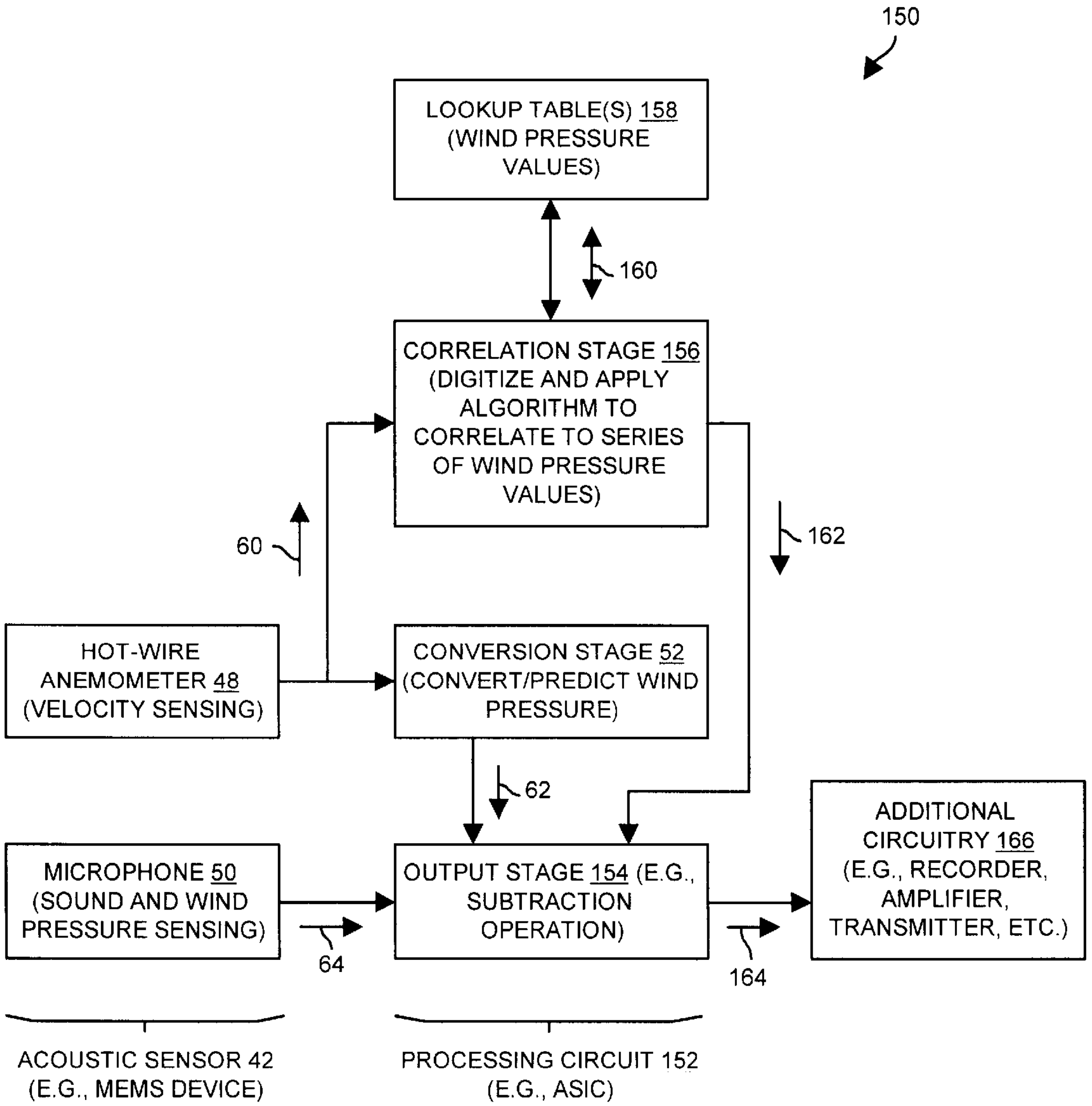
FIG. 8 is a block diagram of an alternative acoustic system having multiple stages for generating a wind pressure signal based on a wind velocity measurement.

FIG. 8 shows an acoustic system 150 which is suitable for use by the invention. The acoustic system 150 is similar to the acoustic system 40 of FIG. 1 in that the acoustic system 150 includes the acoustic sensor 42 having the hot-wire anemometer 48 for sensing wind velocity and the microphone 50 for sensing sound and wind pressure, which operate in a similar manner to those of the acoustic system 40 (also see FIGS. 2 through 6). Alternatively, the acoustic system 150 includes the acoustic sensor 140 of FIG. 7.

The acoustic system 150 of FIG. 8 further includes a processing circuit 152 having a conversion stage 52, an output stage 154, a correlation stage 156 and one or more lookup tables 158. The processing circuit 152 is capable of operating in a manner similar to that of the processing circuit 44 of FIG. 1, i.e., the conversion stage 52 can convert wind velocity information into wind pressure information, and the output stage 154 can provide sound information having wind noise removed. In particular, the conversion stage 52 can convert the wind velocity signal 60 into a wind pressure signal 62, and output the wind pressure signal 62 to the output stage 154. The output stage 154 can receive the wind pressure signal 62 from the conversion stage 52, concurrently receive a sound and wind pressure signal 64 from the microphone 50, and output an output signal 164 based on the wind pressure signal 62 from the conversion stage 52 and the sound and wind pressure signal 64 from the microphone 50. The output signal 164 defines sound sensed by the microphone 50 with wind noise removed.

The processing circuit 152 is further capable of operating in a manner that bypasses the conversion stage 52. In this situation, the correlation stage 156 correlates the wind velocity signal 62 to a wind pressure signal 162 with high fidelity. In particular, the correlation stage 156 generates digitized wind velocity information from the wind velocity signal 60, and applies an algorithm (e.g., one or more fluid dynamic algorithms, real-time DSP algorithms, etc.) to the digitized wind velocity information to generate a wind pressure signal 162. In one arrangement, the lookup tables 158 include a list of entries containing wind pressure values, and a processor of the correlation stage 156 (e.g., running on embedded software) generates a series of keys (e.g., pointers) from the digitized wind velocity information (e.g., current values of the wind velocity signal 60). The keys identify entries in the lookup table 158. The processor retrieves wind pressure values from the lookup tables 158 based on the series of keys (i.e., retrieves a series of wind pressure values correlated with the wind velocity signal 60) and provides those values in the wind pressure signal 162 to the output stage 154 (e.g., as an analog signal using a digital-to-analog converter). The output stage 154 then performs a subtraction operation to provide, as the output signal 164, sound information with wind noise removed. Accordingly, a user can select between multiple operating modes (i.e., using the conversion stage 52 or by bypassing the conversion stage 52 and using the correlation stage 156 depending on which mode provides better wind noise removal results for a particular situation.

It should be understood that the correlation stage 156 can include a D/A converter to provide the wind pressure signal 162 as an analog signal for processing by the output stage

154. Alternatively, the wind pressure signal 162 can be a digital signal, and the output stage 154 can include an A/D converter to digitize the sound and wind pressure signal 64 before further providing the output signal 164 based on the digital wind pressure signal 162 and the (digitized) sound and the wind pressure signal 64.

It should be further understood that the one or more algorithms applied to the wind velocity signal 60 can be conventional algorithms (e.g., mature macro fluid dynamics equations, recently developed micro fluid dynamics equations, dynamically entered equations based on specific applications of the acoustic system 140, or combinations thereof). For example, a user can initially operate the acoustic system 140 using macro fluid dynamics equations. The user can then introduce or replace a particular macro fluid dynamics equation with a micro fluid dynamics equation (i.e., a fluid dynamics equation pertinent to the micromachined device level) and run the acoustic system 140 to determine whether such introduction or replacement provides an improved output signal 164. After that, the user can adjust the acoustic system 140 with a dynamically entered fluid dynamics equation (perhaps based on new experimental data) to see if that further improves the output signal 164, and so on.

It should be understood that the above-described acoustic sensors 40 and 140 can be MEMS devices. In such configurations, the acoustic sensors 40 and 140 are suitable for miniature applications such as palm-sized camcorders, pocket-sized cellular telephones, covert surveillance equipment, and so on (as well as non-miniaturized applications). Accordingly, the acoustic sensors 40 and 140 are well suited for many situations where bulky foam windscreens are cumbersome or simply are not appropriate.

Embodiments of the invention are directed to techniques for constructing a MEMS device having a collocated hot-wire anemometer 48 and a microphone 50 as described above in connection with the acoustic sensors 40 and 140. A description of how such a device can be constructed will now be provided with reference to FIGS. 9 through 39.

Figure 9:
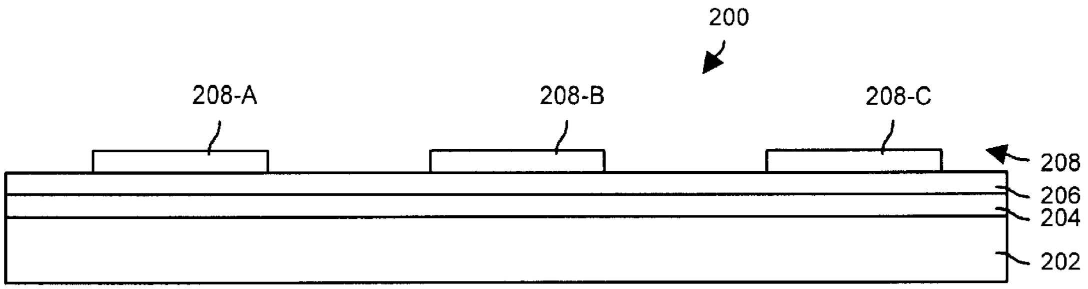
FIG. 9 is a cross-sectional view of a MEMS structure which includes a substrate, an epitaxial layer, a layer of conductive material and photoresist areas (e.g., after patterning using photoresist and photomasking techniques).

FIG. 9 shows a cross-sectional view 200 of a MEMS structure which is suitable for undergoing a micromachining process in order to form the acoustic sensor 140 of FIG. 7 (i.e., an acoustic sensor having multiple acoustic sensing elements 142). It should be understood that a similar MEMS structure can be used to form the acoustic sensor 40 of FIGS. 3 and 4 (i.e., a single acoustic sensing element). The micromachining process used to make the acoustic sensors 40, 140 includes steps which maintain the temperature of the MEMS structure below 700 degrees Celsius, rather than allow the temperature to equal or exceed 700 degrees Celsius as typically occurs in conventional semiconductor fabrication processes. Accordingly, there is minimal or no distortion caused by the use of high temperature fabrication processes when manufacturing the microengineered structures of the MEMS device.

As shown in FIG. 9, the MEMS structure initially includes a substrate 202, an epitaxial layer 204, a layer 206 of conductive material and photoresist areas 208-A, 208-B, . . . (collectively, photoresist areas 208). Preferably, the substrate 202 is single crystal silicon, and the epitaxial layer 204 is epitaxial silicon with dopant in order to operate as an etch stop. That is, the epitaxial layer 204 can vary in thickness from 1 to 10 microns, and acts as an etch stop for wet anisotropic etching (to be explained shortly). The layer 206 is conductive material such as polycrystalline silicon, an appropriate silicide, etc. The photoresist areas 208 is a polymer that operates as an etch mask during etching of the underlying material. The photoresist areas 208 can be formed from a photoresist layer using either positive resist or negative resist techniques (i.e., ultraviolet light exposure, development, washing, etc.).

Figure 10:
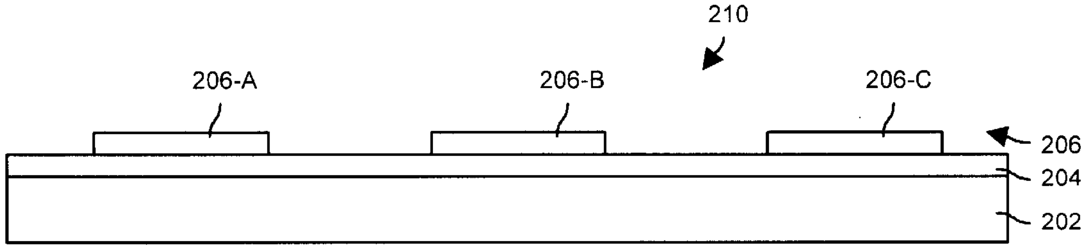
FIG. 10 is a cross-sectional view of the MEMS structure of FIG. 9 after portions of the layer of conductive material and the photoresist areas have been removed.

FIG. 10 is a cross-sectional view 210 of the MEMS structure of FIG. 9 after portions of the layer 206 of conductive material and the photoresist areas 208 have been removed (i.e., after patterning and etching metal). The epitaxial layer 204 later can be configured to be flexible. As such, the portions of the conductive material layer 206 which remain on the epitaxial layer 204 will eventually form microphone diaphragms 72 of the acoustic sensor 140 (also see the microphone diaphragm 72 in FIGS. 2 through 4). That is, the conductive material layer 206 will be able to move in response to wind and sound pressure, i.e., turbulence from wind/flow as well as from acoustic propagation (sound).

Figure 11:
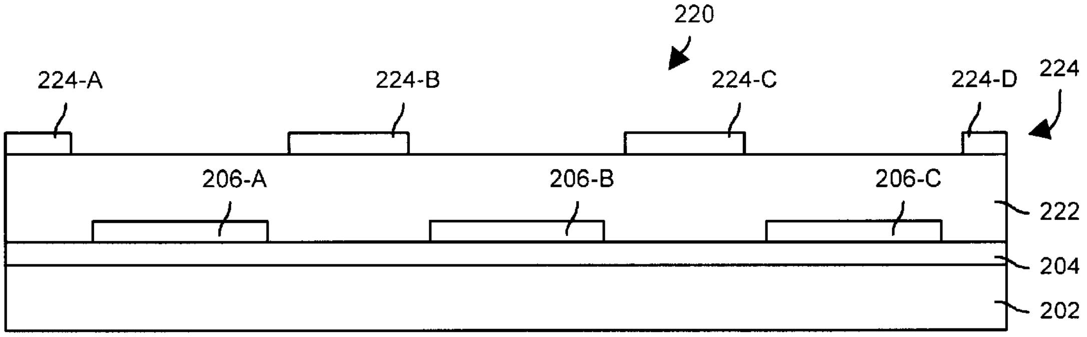
FIG. 11 is a cross-sectional view of the MEMS structure of FIG. 10 after a low temperature oxide layer and photoresist areas have been added.

FIG. 11 is a cross-sectional view 220 of the MEMS structure of FIG. 10 after a low temperature oxide (LTO) layer 222 and new photoresist areas 224 have been added. In one arrangement, the LTO layer 222 is silicon dioxide which is formed using a chemical vapor deposition (CVD) process (e.g., using a CVD furnace).

Figure 12:
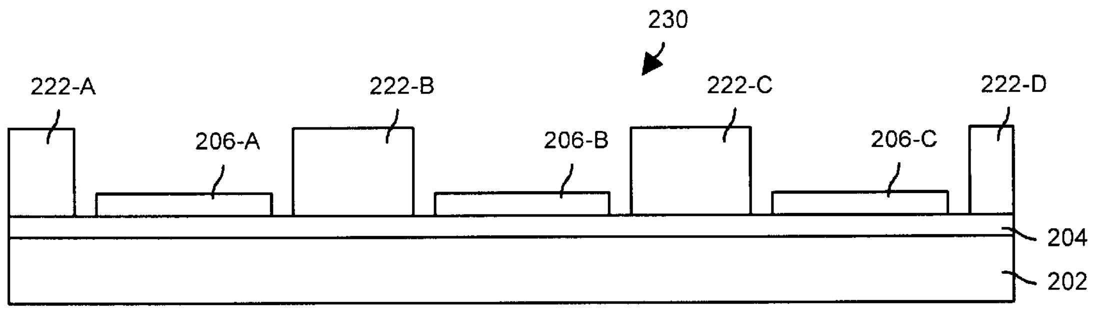
FIG. 12 is a cross-sectional view of the MEMS structure of FIG. 11 after portions of the low temperature oxide layer and the photoresist areas have been removed.

FIG. 12 is a cross-sectional view 230 of the MEMS structure of FIG. 11 after portions of the LTO layer 222 and the photoresist areas 224 have been removed. The remaining portion of the LTO layer 222 forms part (i.e., walls) of the base of the acoustic sensor 140 (also see the base 94 of FIG. 3).

Figure 13:
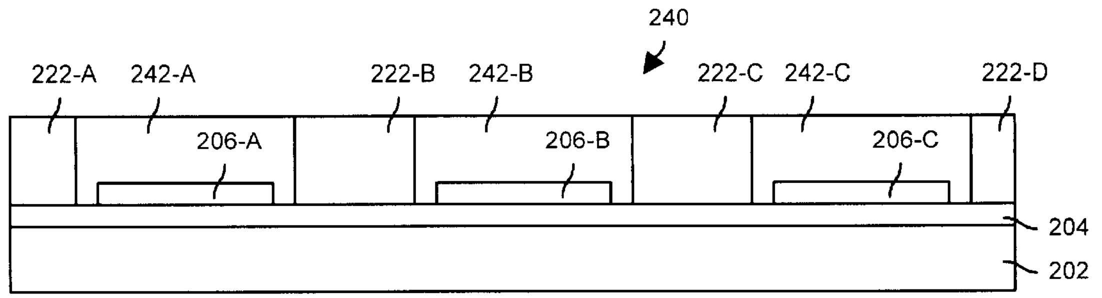
FIG. 13 is a cross-sectional view of the MEMS structure of FIG. 12 after polyimide has been added and the structure surface has been polished.

FIG. 13 is a cross-sectional view 240 of the MEMS structure of FIG. 12 after polyimide 242 has been added and after the structure surface has been planarized (e.g., after the MEMS structure has been planarized with polyimide and a reflow and blanket ash). Alternatively, the MEMS structure is polished until the tops of the LTO portions 222 are exposed. Accordingly, portions of polyimide 242-A, 242-B, . . . now fill locations where the removed portions of the LTO layer 222 once resided.

Figure 14:
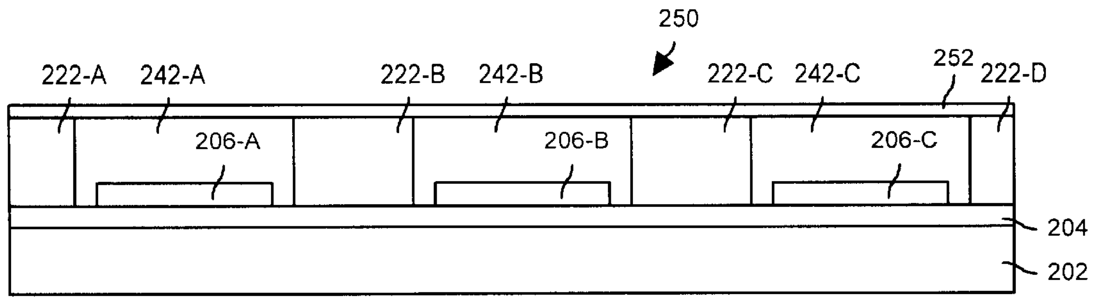
FIG. 14 is a cross-sectional view of the MEMS structure of FIG. 13 after a layer of conductive material (e.g., tungsten) has been added.

FIG. 14 is a cross-sectional view 250 of the MEMS structure of FIG. 13 after a layer 252 of conductive material has been added. In one arrangement, the layer 252 of conductive material includes metallic material such as tungsten which is provided over the LTO and polyimide portions using CVD. Other material could be used as well such as polycrystalline silicon, an appropriate silicide, carbon or other highly resistive materials which are suitable for MEMS or semiconductor fabrication processes.

Figure 15:
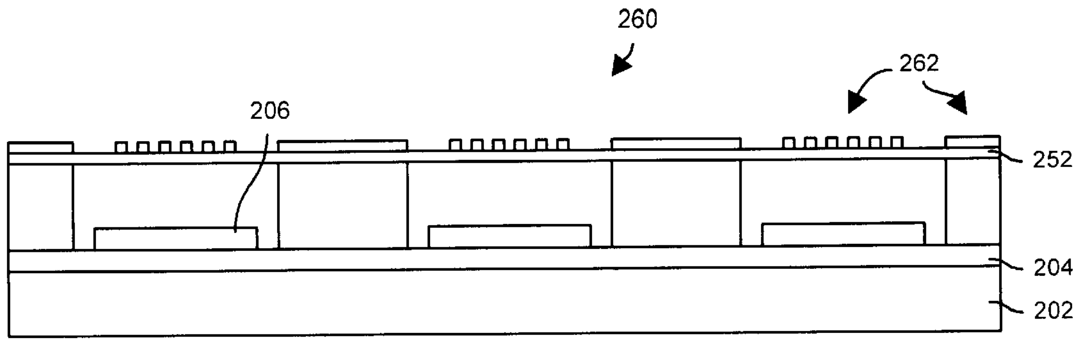
FIG. 15 is a cross-sectional view of the MEMS structure of FIG. 14 after photoresist areas have been added.

FIG. 15 is a cross-sectional view 260 of the MEMS structure of FIG. 14 after photoresist areas 262 have been added over the layer 252 of conductive material.

Figure 16:
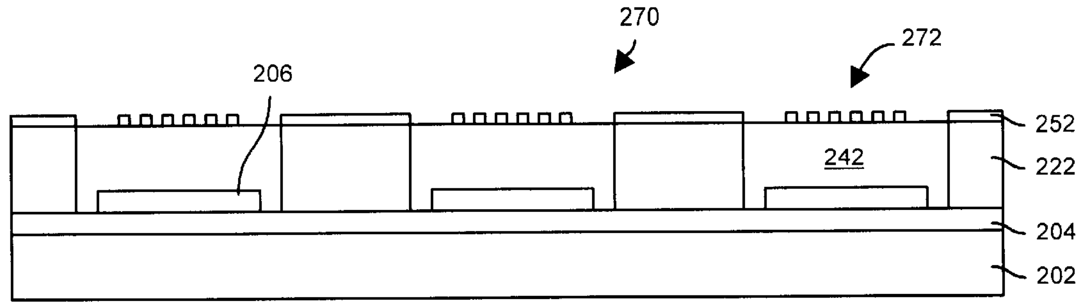
FIG. 16 is a cross-sectional view of the MEMS structure of FIG. 15 after portions of the layer of conductive material and the photoresist areas have been removed.

FIG. 16 is a cross-sectional view 270 of the MEMS structure of FIG. 15 after portions of the layer 252 of conductive material and the photoresist areas 262 have been removed (e.g., etched away). Some of the remaining portions of the layer 252 of conductive material form sets of hot-wire extending members 78 (as well as the bond pads 124-A, 124-B) for the hot-wire anemometers 48 of the acoustic sensor 140. These micromachined elements can be significantly more reliable and resilient than conventional fragile hot-wire anemometer components. Other portions of the conductive material layer 252 form part of the base (see the base 94 of FIG. 3).

Figure 17:
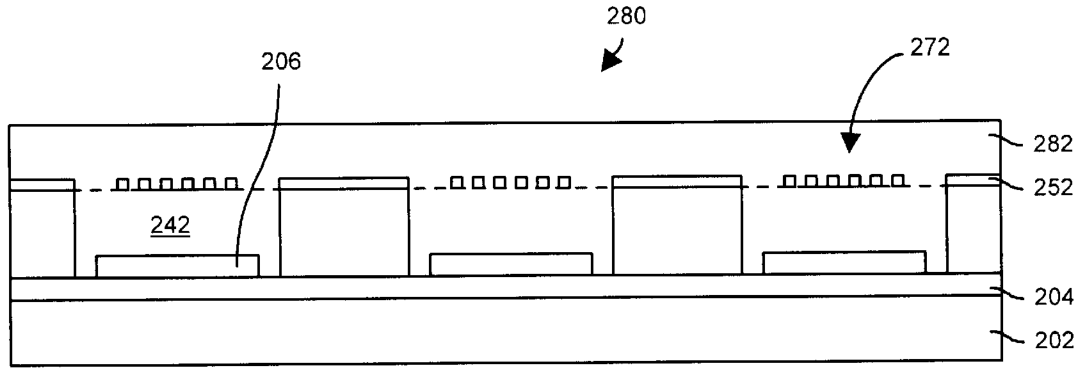
FIG. 17 is a cross-sectional view of the MEMS structure of FIG. 16 after additional polyimide has been added.

FIG. 17 is a cross-sectional view 280 of the MEMS structure of FIG. 16 after additional polyimide 282 has been added over the remaining portions of the conductive material layer 252 and the earlier-provided polyimide 242. The polyimide 242, 282 provides protection and support for remaining portions of the conductive material layer 252, and will eventually be removed.

Figure 18:
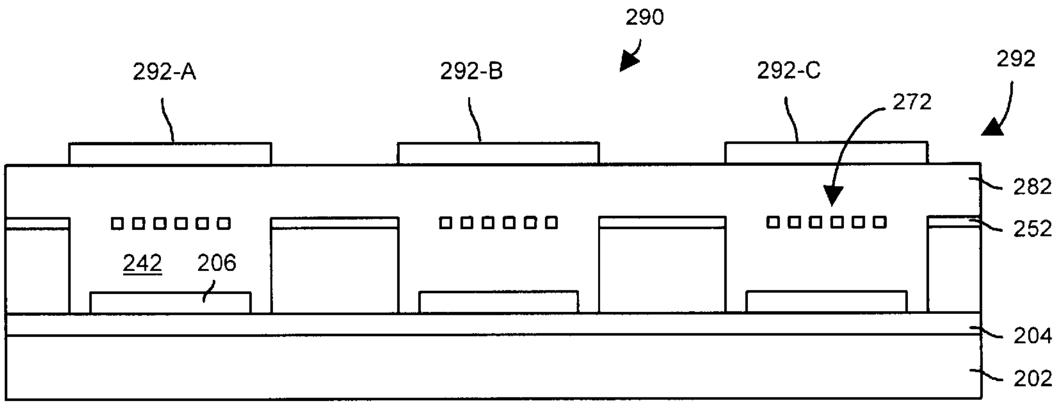
FIG. 18 is a cross-sectional view of the MEMS structure of FIG. 17 after photoresist areas have been added.

FIG. 18 is a cross-sectional view 290 of the MEMS structure of FIG. 17 after photoresist areas 292-A, 292-B, . . . have been added over the polyimide 282.

Figure 19:
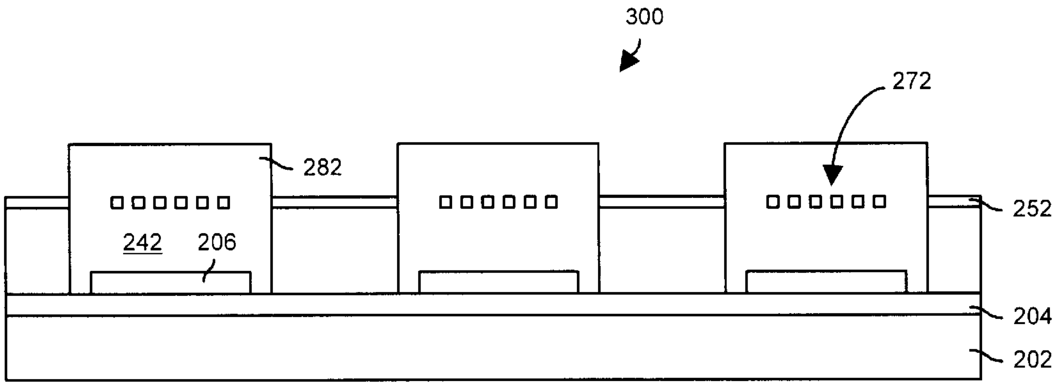
FIG. 19 is a cross-sectional view of the MEMS structure of FIG. 18 after portions of the polyimide and the photoresist areas have been removed.

FIG. 19 is a cross-sectional view 300 of the MEMS structure of FIG. 18 after portions of the polyimide 282 and the photoresist areas 292 have been removed (e.g., etched away). Such etching can occur in a regular reactor to give directionality for an anisotropic etch.

Figure 20:
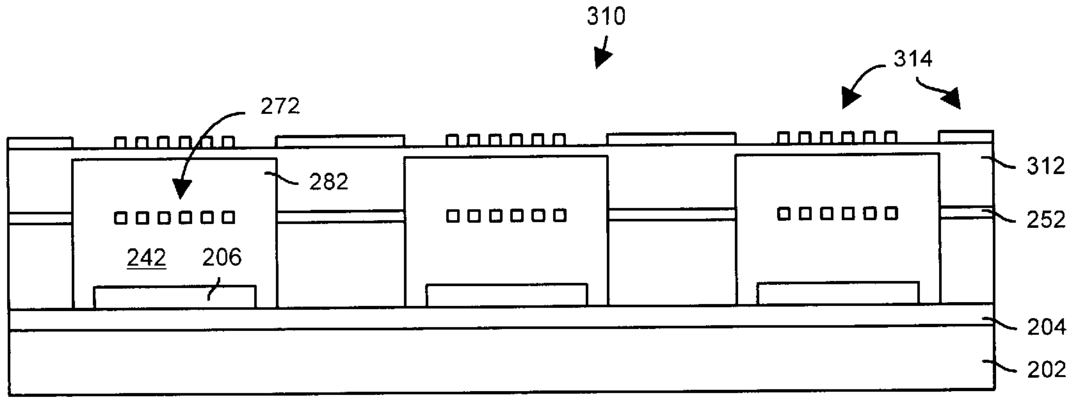
FIG. 20 is a cross-sectional view of the MEMS structure of FIG. 19 after a layer of base material (e.g., plasma enhanced chemical vapor depositioned nitride) and photoresist areas have been added.

FIG. 20 is a cross-sectional view 310 of the MEMS structure of FIG. 19 after a layer of base material 312 has been added over the remaining portion of the conductive layer 252 and the remaining polyimide 282, and after photoresist areas 314 have been added over the base material layer 312. In one arrangement, the base material layer 312 is silicon nitrite provided using a plasma enhanced chemical vapor deposition (PECVD) process. Alternatively, silicon oxide can be applied using spin-on-glass technology.

Figure 21:
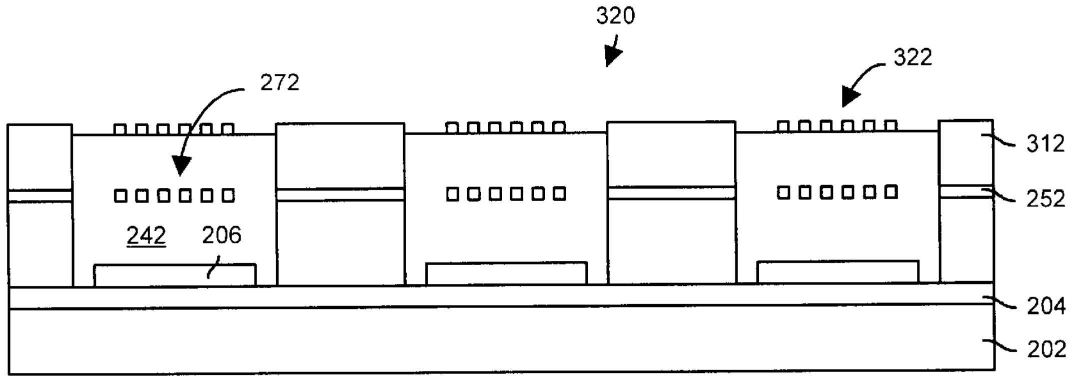
FIG. 21 is a cross-sectional view of the MEMS structure of FIG. 20 after portions of the base material layer and the photoresist portions have been removed.

FIG. 21 is a cross-sectional view 320 of the MEMS structure of FIG. 20 after portions of the base material layer 312 and the photoresist portions 314 have been removed. Plasma etching can be performed using fluorine. Portions of the remaining base material layer 312 form part of the base 92 (see portion 92-A of FIG. 3). Other portions 322 of the remaining base material layer 312 for the protective material mesh 80, e.g., in a grid pattern (also see FIGS. 2 and 3).

Figure 22:
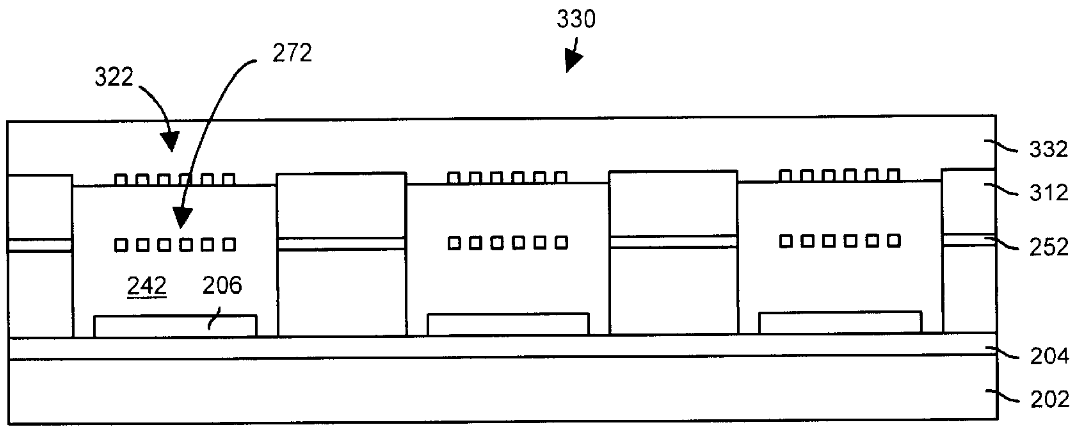
FIG. 22 is a cross-sectional view of the MEMS structure of FIG. 21 after a protective layer of material has been added.

FIG. 22 is a cross-sectional view 330 of the MEMS structure of FIG. 21 after a protective layer 332 of material has been added. This protective layer can include more polyimide and will eventually be removed.

Figure 23:
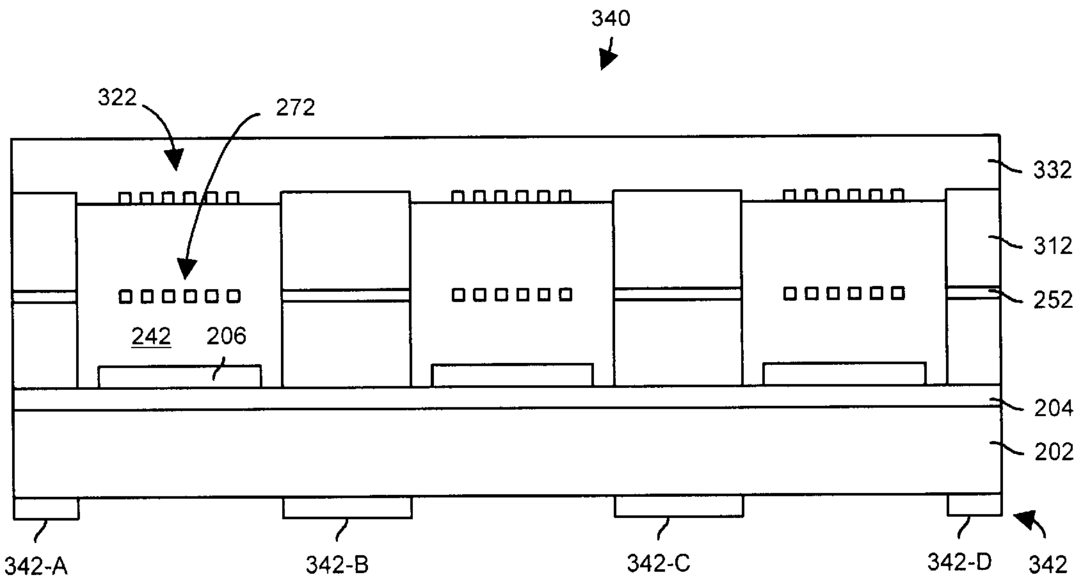
FIG. 23 is a cross-sectional view of the MEMS structure of FIG. 22 after photoresist areas have been added onto the substrate (i.e., onto the bottom of the MEMS structure).

FIG. 23 is a cross-sectional view 340 of the MEMS structure of FIG. 22 after photoresist areas 342 have been added onto the substrate 202 (i.e., onto the bottom of the MEMS structure). After the protective layer 332 has been added (FIG. 22), the MEMS structure can be flipped (turned upside down) and processed in order to form the photoresist areas 342.

Figure 24:
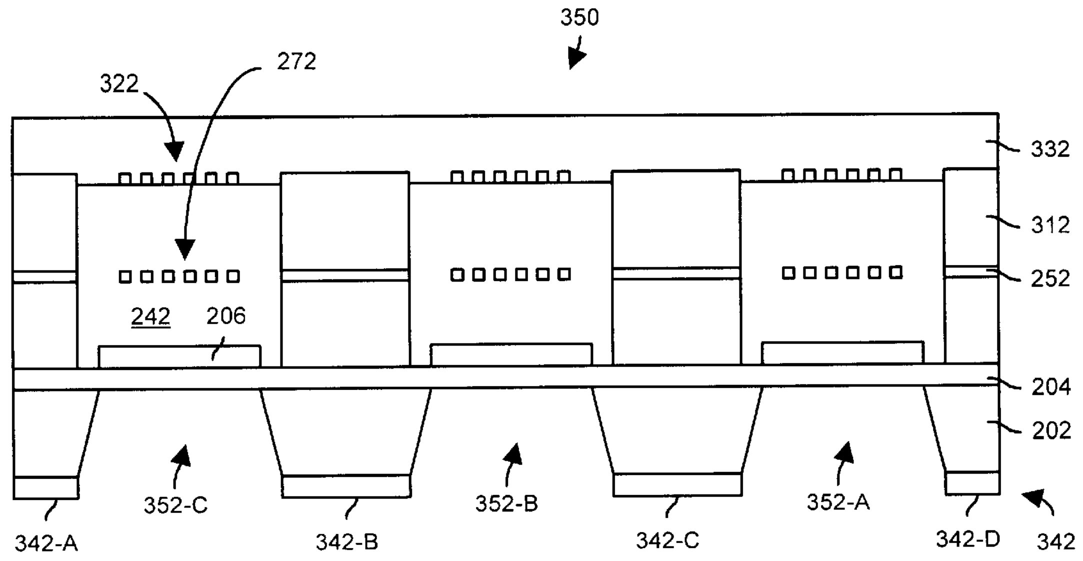
FIG. 24 is a cross-sectional view of the MEMS structure of FIG. 23 after portions of the substrate have been removed (e.g., anisotropically wet etched).

FIG. 24 is a cross-sectional view 350 of the MEMS structure of FIG. 23 after portions of the substrate 202 have been removed to form cavity portions 352-A, 352-B, 352-C. In one arrangement, the MEMS structure is anisotropically wet etched, e.g., using potassium hydroxide/isopropanol. Alternatively, tetramethylamonium hydroxide can be used.

Figure 25:
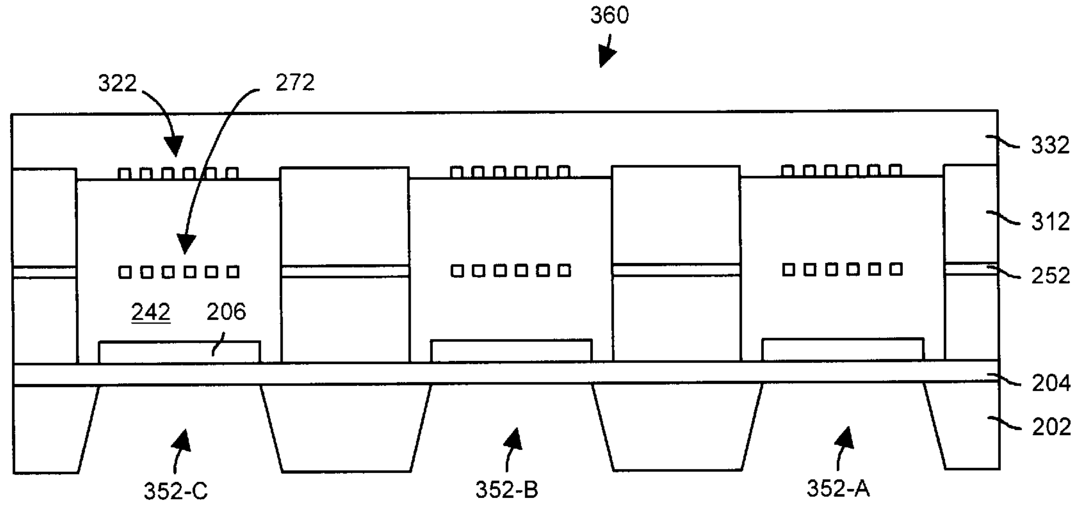
FIG. 25 is a cross-sectional view of the MEMS structure of FIG. 24 after the photoresist portions have been removed from the substrate.

FIG. 25 is a cross-sectional view 360 of the MEMS structure of FIG. 24 after the photoresist portions 342 have been removed from the substrate 202. The MEMS structure is now ready for combination with another MEMS structure in order to form the acoustic sensor 140. Further details of how the other MEMS structure is formed will now be provided with reference to FIGS. 26 through 30.

Figure 26:
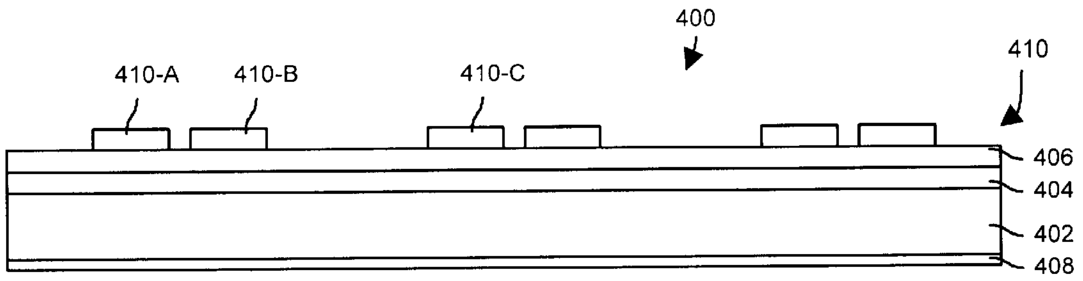
FIG. 26 is a cross-sectional side view of another MEMS structure which includes a substrate, a layer of borosilicate glass, an epitaxial layer, a layer of conductive material and areas of photoresist.

FIG. 26 is a cross-sectional side view 400 of the other MEMS structure which is suitable for micromachining in order to form part of the acoustic sensor 140 of FIG. 7. The micromachining process used to make this part of the acoustic sensor 140 includes semiconductor/micromachine fabrication steps which maintain the temperature of the MEMS structure below 700 degrees Celsius. Accordingly, there is little or no distortion of the fabricated features.

As shown in FIG. 26, the MEMS structure initially includes a substrate 402, an epitaxial layer 404 over the substrate 402, a layer 406 of conductive material over the epitaxial layer 404, a layer 408 of borosilicate glass over an opposite side of the substrate 402, and photoresist areas 410-A, 410-B, . . . (collectively, photoresist areas 410) over the conductive material layer 406.

As with the substrate 202 of FIG. 9, the substrate 402 of FIG. 26 is single crystal silicon, and the epitaxial layer 404 is epitaxial silicon with dopant in order to operate as an etch stop. The layer 406 is conductive material such as polycrystalline silicon, an appropriate silicide, etc. The photoresist areas 410 is a polymer that operates as an etch mask during etching of the underlying material.

Figure 27:
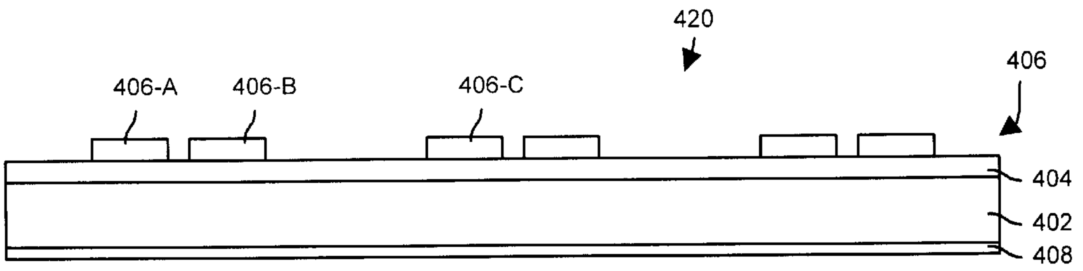
FIG. 27 is a cross-sectional side view of the MEMS structure of FIG. 26 after portions of the layer of conductive material and the photoresist areas have been removed.

FIG. 27 is a cross-sectional side view 420 of the MEMS structure of FIG. 26 after portions of the layer 406 of conductive material and the photoresist areas 410 have been removed. The portions of the conductive material layer 406 which remain on the epitaxial layer 404 will eventually form the rigid members 74 of the microphones 50 of the acoustic sensor 140 (also see FIGS. 2 through 4).

Figure 28:
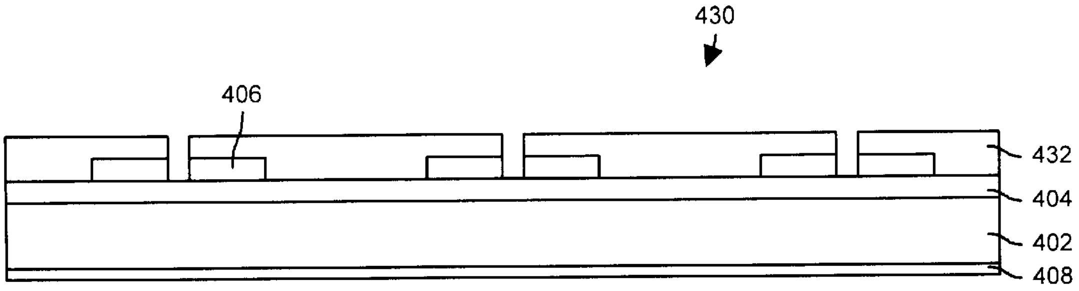
FIG. 28 is a cross-sectional side view of the MEMS structure of FIG. 27 after photoresist areas have been added.

FIG. 28 is a cross-sectional side view 430 of the MEMS structure of FIG. 27 after photoresist areas 432 have been added.

Figure 29:
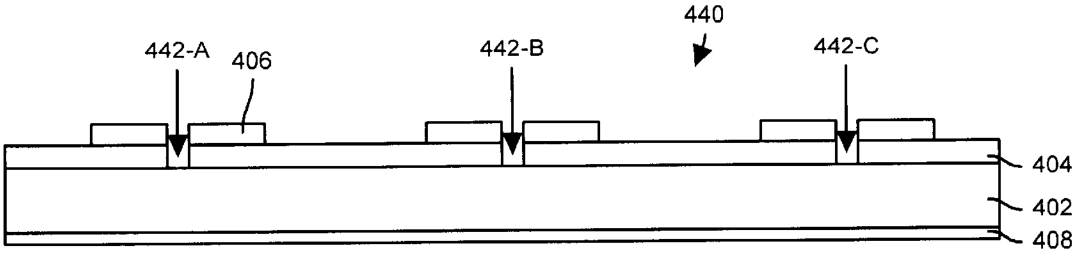
FIG. 29 is a cross-sectional side view of the MEMS structure of FIG. 28 after a portion of the epitaxial layer and the photoresist areas have been removed.

FIG. 29 is a cross-sectional side view 440 of the MEMS structure of FIG. 28 after a portion of the epitaxial layer 404 and the photoresist areas 432 have been removed. Accordingly, holes 442-A, 442-B, . . . are now defined by the epitaxial layer 404 and the remaining conductive layer portions 406. Each hole 442 will become the hole 76 leading into a condenser microphone cavity 96 (see FIG. 3).

Figure 30:
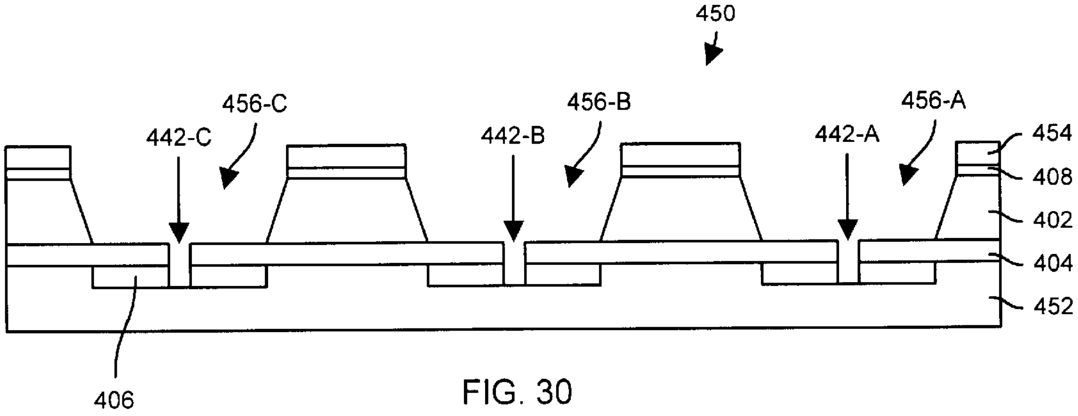
FIG. 30 is a cross-sectional side view of the MEMS structure of FIG. 29 after a protective layer of material has been added over the remaining epitaxial and conductive material layers, after the MEMS structure is turned upside down, and after portions of the layer of borosilicate glass and portions of the substrate have been covered with photoresist areas and anisotropically etched to form portions of condenser microphone cavities.

FIG. 30 is a cross-sectional side view 450 of the MEMS structure of FIG. 29 after a number of procedures. In particular, FIG. 30 shows the MEMS structure after the MEMS structure is turned upside down, after a protective layer 452 of material has been added over the remaining epitaxial layer 404 and the remaining conductive layer portions 406, and after portions of the layer 408 of borosilicate glass and portions of the substrate 402 have been covered with photoresist areas 454 and anisotropically etched to form portions 456 of the condenser microphone cavities 96. The photoresist areas 454 are subsequently removed.

Figure 31:
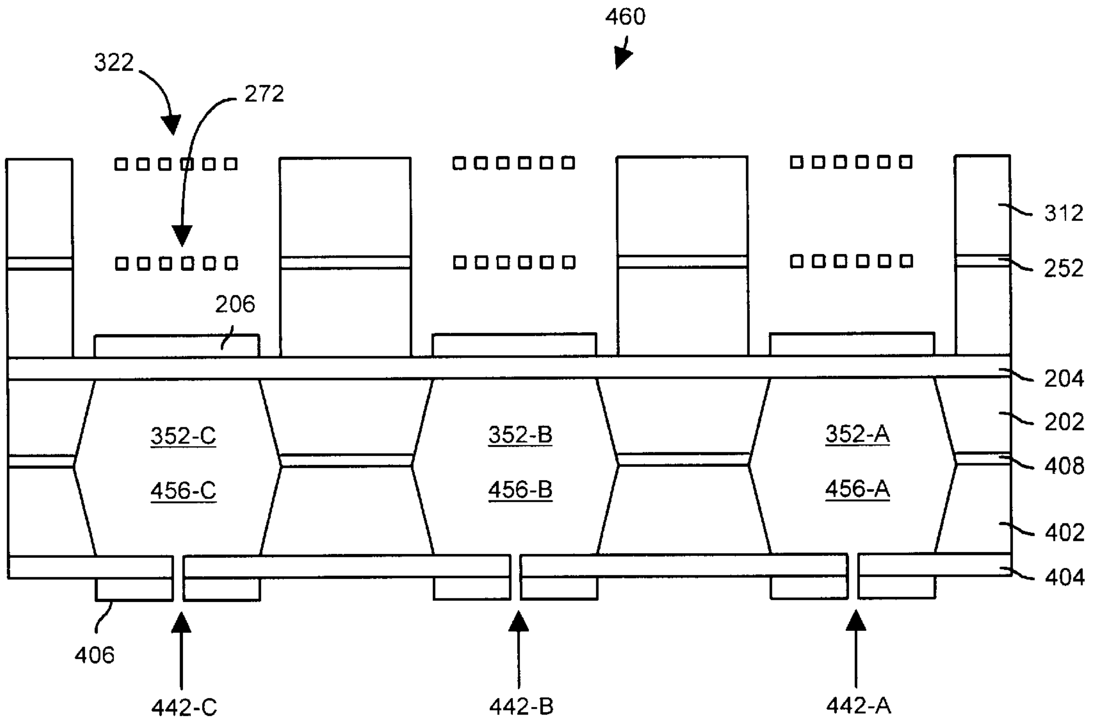
FIG. 31 is a cross-sectional view of a MEMS device formed by bonding the MEMS structure of FIG. 25 and the MEMS structure of FIG. 30 together (e.g., via anodic bonding), and removing the protective layers, to form a MEMS device having multiple acoustic sensors.

FIG. 31 is a cross-sectional view 460 of a MEMS device formed by bonding the MEMS structure of FIG. 25 and the MEMS structure of FIG. 30 (with the photoresist areas 454 removed). In one arrangement, the MEMS structures of FIGS. 25 and 30 are combined via anodic bonding. The protective layers (i.e., the polyimide portions 242, 282, and 332 are also removed. The end result is the acoustic sensor 140 (i.e., an acoustic sensing MEMS device) having multiple acoustic sensing elements 142 (also see FIG. 7).

Figure 32:
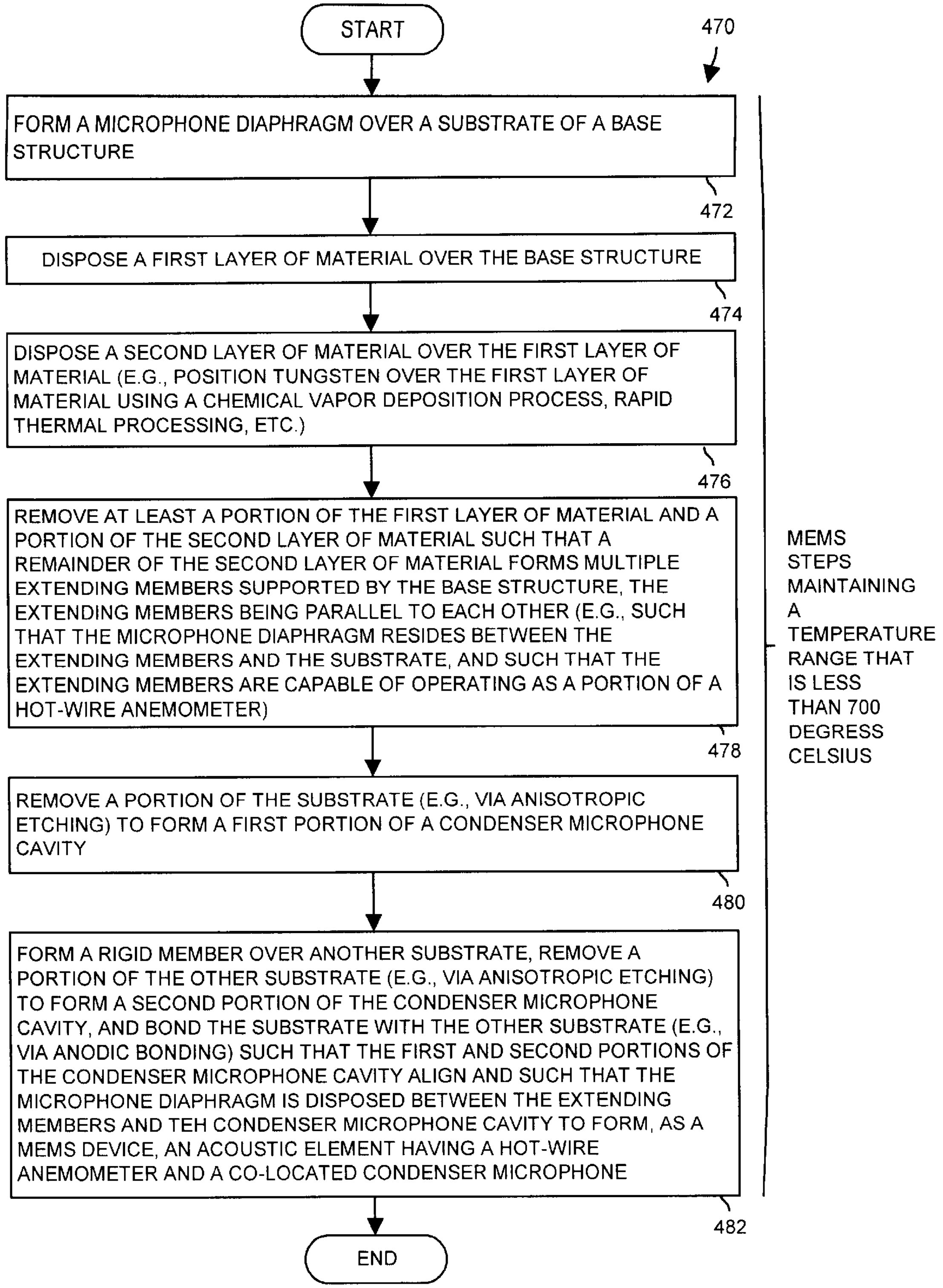
FIG. 32 is a flowchart of a procedure for forming a MEMS device which is suitable for use in the acoustic system of FIG. 1.

FIG. 32 is a flowchart of a procedure 470 for forming an acoustic sensor such as the MEMS device of FIG. 31. The procedure 470 is performed by a MEMS device manufacturer (e.g., a semiconductor fabrication facility).

In step 472, the manufacturer forms a microphone diaphragm over a substrate of a base structure. Such processing can be carried out by forming a metallic portion 206 over a substrate 202 as described above in connection with FIGS. 9 through 10.

In step 474, the manufacturer disposes a first layer of material over the base structure. This process can be carried out by forming an LTO region 222 and a polyimide region 242 over the substrate 202 (e.g., a polyimide region within a cylindrical shaped cavity defined by the LTO region 222) as described above in connection with FIGS. 11 through 13.

In step 476, the manufacturer disposes a second layer of material over the first layer of material. This process can be carried out by positioning a layer of tungsten (or alternatively polycrystalline silicon, an appropriate silicide, etc.) over the first layer formed by the LTO region 222 and the polyimide region 242 using CVD (or RTP) as described above in connection with FIG. 14.

In step 478, the manufacturer removes at least a portion of the first layer and a portion of the second layer such that a remainder of the second layer forms multiple extending members supported by the base structure and such that the extending members are substantially parallel to each other. In particular, manufacturer removes the polyimide regions 242 forming part of the first layer as well as portions of the tungsten layer forming the second layer. The removal of portions of tungsten can be carried out as described above in connection with FIGS. 15 through 16. Optionally, removal of the polyimide can occur at or near the end of the whole process thus allowing the polyimide to support and protect the extending members through later processing steps. Eventually, the multiple extending members form the set of hot-wire extending members 78 of the hot-wire anemometer 48.

In step 480, the manufacturer removes a portion of the substrate (e.g., via anisotropic etching) to form a first portion of a condenser microphone cavity. This process can be carried out as described above in connection with FIGS. 23 through 25.

In step 482, the manufacturer forms a rigid member over another substrate, removes a portion of that substrate to form a second portion of the condenser microphone cavity (e.g., via anisotropic etching), and bonds the substrates together (e.g., via anodic bonding) such that the condenser microphone cavities align and such that the microphone diaphragm is disposed between the extending members and the condenser microphone cavity. The result is a MEMS device having an acoustic sensing element (e.g., see the acoustic sensor 42 of FIGS. 3 and 4). The element includes the hot-wire anemometer 48 and the microphone 50 (see FIG. 1).

It should be understood that there are alternative approaches to forming parts of the above-described MEMS device. For example, there are other ways to form a bottom portion of the MEMS device.

Figure 33:
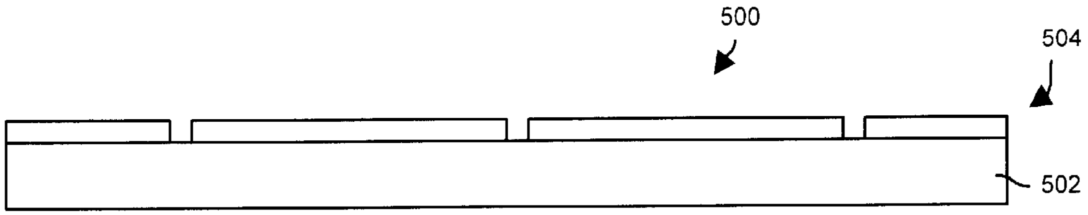
FIG. 33 is a cross-sectional side view of another MEMS structure which includes a substrate and areas of photoresist.

FIG. 33 is a cross-sectional side view 500 of another MEMS structure which is suitable for micromachining in order to form a lower part of the acoustic sensor 140 of FIG. 7. As with the other processes described above, the micromachining process used to make this part of the acoustic sensor 140 includes semiconductor/micromachine fabrication steps which maintain the temperature of the MEMS structure below 700 degrees Celsius. As such, there is little or no distortion of the micromachined features.

As shown in FIG. 33, the MEMS structure initially includes a substrate 502, an a photoresist layer 504 over the substrate 402.

Figure 34:
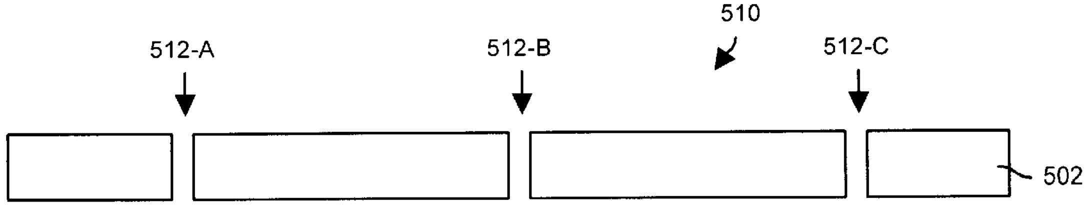
FIG. 34 is a cross-sectional side view of the MEMS structure of FIG. 33 after portions of the substrate and the photoresist areas have been removed to form holes or, alternatively, after holes have been drilled through a solid substrate.

FIG. 34 is a cross-sectional side view 510 of the MEMS structure of FIG. 33 after portions of the substrate 502 and the photoresist layer 504 have been removed to form holes 512. A long anisotropic etch can be performed to provide the holes 512. Alternatively, the holes 512 are simply pre-drilled through the substrate 502 (e.g., a borosilicate glass wafer). The use of borosilicate glass wafers (even with pre-drilled holes) can significantly reduce the costs of the MEMS structure since there are fewer masking steps and no need to deposit a borosilicate glass layer over the substrate 502 (see the borosilicate layer 408 in FIG. 26).

Figure 35:
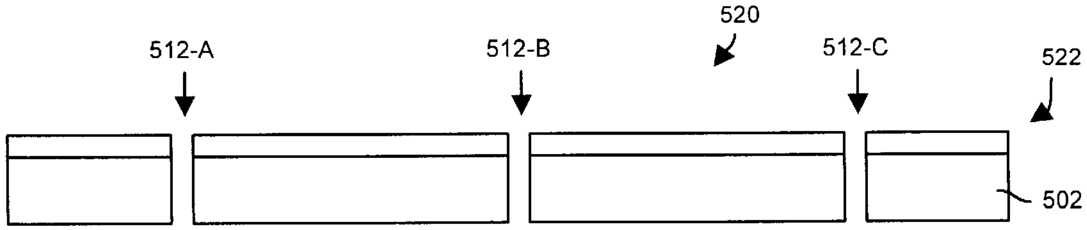
FIG. 35 is a cross-sectional side view of the MEMS structure of FIG. 34 after a layer of conductive material has been applied over the substrate such that the holes within the substrate are left open (e.g., after conductive material has been E-beam evaporated onto the substrate).

FIG. 35 is a cross-sectional side view 520 of the MEMS structure of FIG. 34 after a layer 522 of conductive material has been applied over the substrate 502 such that the holes 512 within the substrate 502 are left open (e.g., after conductive material has been E-beam evaporated in order to avoid filling the holes 512).

Figure 36:
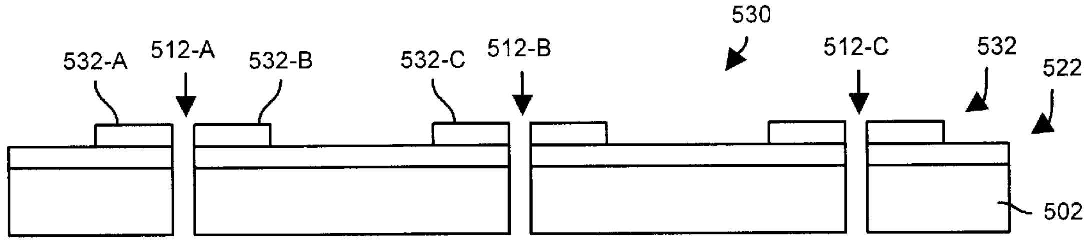
FIG. 36 is a cross-sectional side view of the MEMS structure of FIG. 35 after photoresist areas have been added.

FIG. 36 is a cross-sectional side view 530 of the MEMS structure of FIG. 35 after a photoresist layer 532 has been added over the layer 522 of conductive material.

Figure 37:
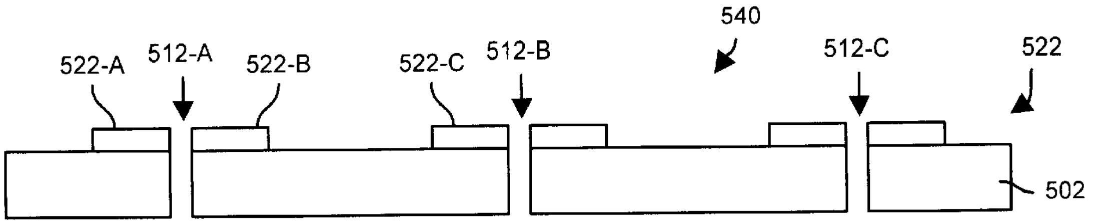
FIG. 37 is a cross-sectional side view of the MEMS structure of FIG. 36 after portions of the conductive material and the photoresist areas have been removed.

FIG. 37 is a cross-sectional side view 540 of the MEMS structure of FIG. 36 after portions of the conductive material layer 522 and the photoresist layer 532 have been removed.

Figure 38:
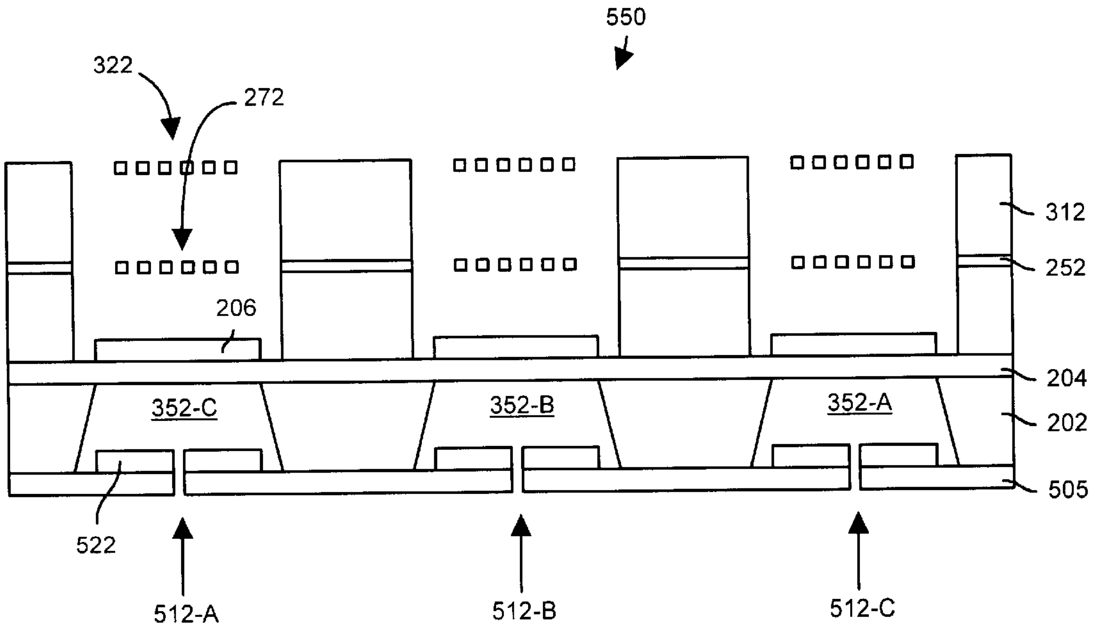
FIG. 38 is a cross-sectional view of a MEMS device formed by bonding the MEMS structure of FIG. 25 and the MEMS structure of FIG. 37 together (e.g., via anodic bonding), and removing the protective layers, to form a MEMS device having multiple acoustic sensors.

FIG. 38 is a cross-sectional view 550 of a MEMS device formed by bonding the MEMS structure of FIG. 25 and the MEMS structure of FIG. 37 together (e.g., heating to anodically bond the two MEMS structures), and removing the protective layers (e.g., polyimide), to form a MEMS device having multiple acoustic sensing elements.

It should be understood that the remaining portions of conductive material 522 form the rigid members 74 of the microphones 50. In contrast to the MEMS device of FIG. 31, the rigid members 74 are disposed within the condenser microphone cavities 352 defined by the substrate 202 and the substrate 502 (recall that the rigid members of the MEMS device of FIG. 31 reside outside the condenser microphone cavities 352).

Figure 39:
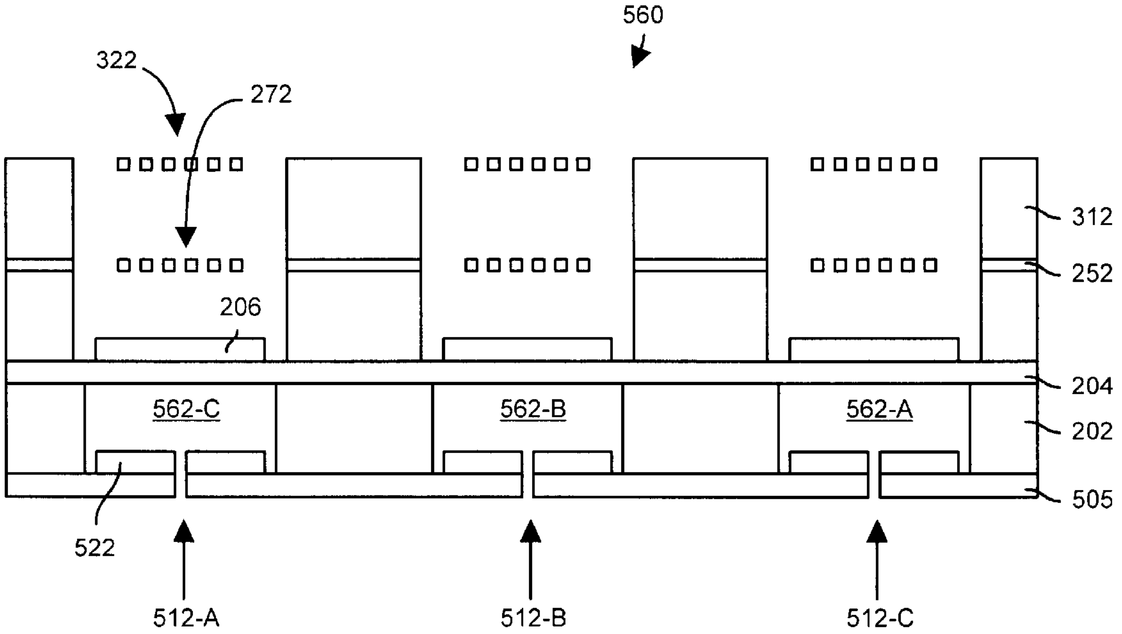
FIG. 39 is a cross-sectional view of the MEMS structure of FIG. 23 after portions of the substrate have been removed (e.g., anisotropically plasma etched).

It should be further understood that the sides of the condenser microphone cavities 352 thus described have been tapered due to wet anisotropic etching. In other arrangements, the sides of the condenser microphone cavities are substantially straight (e.g., substantially perpendicular to the microphone diaphragms formed by metallic portions 206. FIG. 39 is a cross-sectional view 560 of the MEMS structure of FIG. 23 after portions of the substrate have been removed (e.g., anisotropically plasma etched) thus leaving the sides of condenser microphone cavities 562 substantially straight.

It should be understood that the above-described fabrication steps can utilize standard silicon processes. Additionally, the fabrication steps do not require expensive photolithography techniques since the features can be implemented with fairly large dimensions (e.g., on the scale of microns rather than on a sub-micron scale). Also, in connection with etching portions of the substrate to define the condenser microphone cavities, anisotropic plasma etching can be used in place of wet anisotropic etching in order to eliminate V-grooves and thus enable reduction of the overall chip sizes.

Furthermore, as explained earlier, the MEMS structures used in the acoustic systems of the invention are preferably manufactured under temperatures that are less than 700 degrees Celsius. Accordingly, there is little, if any, temperature distortion and the MEMS device has high precision, i.e., is manufactured with high micromachining accuracy.

Also, the invention, when implemented as a MEMS device can be more durable and reliable than the earlier-described conventional experiment setup that uses a hot-wire anemometer having a delicate 1.5 mm filament. Accordingly, the acoustic systems 40, 150 of the invention are suitable for use in commercial uses (e.g., camcorders, outdoor recording devices, broadcasting, hearing aids, cellular phones, etc.) as well as in military/defense applications (e.g., unattended ground sensor systems, acoustic sensing arrays, etc.).

As described above, some embodiments of the invention are directed to techniques for obtaining an acoustical signal using MEMS technology. For example, sensing elements such as a microphone and a hot-wire anemometer can be essentially collocated in a MEMS device. Accordingly, wind velocity as well as sound and wind pressure can be measured at essentially the same location. As such, a wind pressure signal can be generated based on the wind velocity at that location, and then subtracted from the sound and wind pressure obtained at that location thus providing accurate sound with wind noise removed.

The above-described acoustic sensors 40, 150 are suitable in commercial applications such as camcorders, hearing aids, telephones, cellular phones, etc. They are also suitable for use in military/defense applications such as unattended military ground sensors (e.g., for distinguishing tank, car and truck signatures), battlefield acoustic monitoring systems, airplanes, missiles, directional sensors, tactical and covert surveillance devices, etc. The features of the invention, as described above, may be employed in electronic systems, devices and methods such as those of Textron Systems Corporation of Wilmington, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the acoustic sensor 140 (see FIG. 7) was described above as including an N×M array of acoustic sensing elements 142 by way of example only. Other configurations are suitable for the acoustic sensor 140 as well. For instance, the acoustic sensing elements 142 can be arranged in a circular configuration, in concentric circles, in half-circles, in a triangular configuration, in a hexagonal configuration, etc. Furthermore, the N×M array need not include perpendicular rows and columns. Rather, the N×M array can be somewhat irregular in shape (e.g., trapezoidal), or in have an irregular pattern.

Additionally, it should be understood that the acoustic sensing elements 142 were described above as being capable of being grouped into sets, and that the elements 142 for each set can have a different property (e.g., a different mass, shape, thickness or size). In one arrangement, different columns (or rows) of elements 142 have a different property thus tuning the elements 142 of each group to a different frequency. In another arrangement (e.g., an irregular pattern arrangement, an N×M array arrangement, etc.), a first microphone diaphragm is configured to respond to sound waves within a first frequency range, and a second microphone diaphragm configured to respond to sound waves within a second frequency range that is different than the first frequency range. In another arrangement, all of the elements 142 have the same geometries but the signals provided by different sets are electronically weighted. For example, the wind velocity signals and sound and wind pressure signals of acoustic sensing elements 142 along a periphery of the acoustic sensor 140 can be weighted to have less influence than elements 142 near the center.

Furthermore, it should be understood that the acoustic sensor 140 was described as a 3x3 array of acoustic sensing elements 142 by way of example only and that other numbers of columns and rows are suitable. The size and number of columns and rows can be largely dictated by the particular intended application. Due to micromachining advances, large arrays can be manufactured with extremely precise tolerances and high reliability.

Additionally, it should be understood that the mesh protective layer 80 is optional. It is not necessary particularly if protection of the acoustic sensor 40, 140 is provided by another component (e.g., a package of the MEMS device). Also, it should be understood that layouts other than a grid pattern are suitable for use by the mesh protective layer 80 such as circles, hexagons, etc.

Furthermore, it should be understood that the hot-wire extending members 78 were described above as being relatively bar-shaped and parallel to each other by way of example only. Other shapes and arrangements are suitable for use by the hot-wire extending members 78 such as finger-shaped members, interleaved finger arrangements, circular-shaped members, etc.

Additionally, it should be understood that the anemometer 48 was described above as a hot-wire anemometer, and the microphone was described above as a condenser microphone by way of example only. Other types of anemometers and microphones are suitable for use as well. For example, the microphones can be implemented as dynamic microphones (i.e., sensing current through a coil moving through a magnetic field), as Whetstone bridges (i.e., sensing a voltage change in response to a changing resistance due to physical movement of a microphone diaphragm), etc.

Furthermore, it should be understood that the processing circuits 44, 152 were described above as being implemented in an ASIC by way of example only. Other implementations are suitable as well such as in a hybrid circuit (i.e., multiple ICs on a miniature section of circuit board material), ICs mounted on a standard-sized circuit board or in a remote electronic device (which communicates via a transmitter and a receiver), etc.

What is claimed is:

1. An acoustic system comprising:

an acoustic sensor having (I) a base, (ii) a microphone having a microphone diaphragm that is supported by the base, and (iii) a hot-wire anemometer having a set of hot-wire extending members that is supported by the base, the set of hot-wire extending members defining a plane which is substantially parallel to the microphone diaphragm; and a processing circuit that receives a sound and wind pressure signal from the microphone and a wind velocity signal from the hot-wire anemometer, and that provides an output signal based on the sound and wind pressure signal from the microphone and the wind velocity signal from the hot-wire anemometer, wherein the processing circuit includes:

a correlation stage that digitizes the wind velocity signal, correlates the digitized wind velocity signal with a series of wind pressure values from a lookup table, and provides the series of wind pressure values in the form of a correlation signal; and an output stage that (i) receives the correlation signal from the correlation stage, (ii) receives the sound and wind signal from the microphone, and (iii) subtracts the series of wind pressure values from the sound and wind pressure signal to provide the output signal.

2. An acoustic sensor, comprising:

a base;

a microphone supported by the base, the microphone including a microphone diaphragm; and a hot-wire anemometer supported by the base, the hot-wire anemometer including a set of hot-wire extending members that defines a plane which is substantially parallel to the microphone diaphragm, each hot-wire extending member of the set of hot-wire extending members extending substantially within the plane.

3. The acoustic sensor of claim 2 wherein the microphone and the hot-wire anemometer form at least a portion of a microelectromechanical systems device.

4. The acoustic sensor of claim 2 wherein the set of hot-wire extending members includes multiple bridge portions that are substantially parallel to each other within the plane to define elongated gaps that expose the microphone diaphragm.

5. The acoustic sensor of claim 4 wherein the multiple bridge portions and the elongate gaps are disposed in line with the microphone diaphragm to sense a signal in a direction that is substantially perpendicular to the microphone diagram.

6. An acoustic system, comprising:

an acoustic sensor having (i) a base, (ii) a microphone having a microphone diaphragm that is supported by the base, and (iii) a hot-wire anemometer having a set of hot-wire extending members that is supported by the base, the set of hot-wire extending members defining a plane which is substantially parallel to the microphone diaphragm, each hot-wire extending member of the set of hot-wire extending members extending substantially within the plane; and a processing circuit that receives a sound and wind pressure signal from the microphone and a wind velocity signal from the hot-wire anemometer, and that provides an output signal based on the sound and wind pressure signal from the microphone and the wind velocity signal from the hot-wire anemometer.

7. The acoustic system of claim 6 wherein the microphone and the hot-wire anemometer of the acoustic sensor form at least a portion of a microelectromechanical systems device.

8. The acoustic system of claim 6 wherein the set of hot-wire extending members includes multiple bridge portions that are substantially parallel to each other within the plane to define elongated gaps that expose the microphone diaphragm.

9. The acoustic system of claim 8 wherein the multiple bridge portions and the elongate gaps are disposed in line with the microphone diaphragm to sense a signal in a direction that is substantially perpendicular to the microphone diagram.

10. An acoustic sensor, comprising:

a base;

a microphone supported by the base, the microphone including a microphone diaphragm; and a hot-wire anemometer supported by the base, the hot-wire anemometer including a set of hot-wire extending members that defines a plane which is substantially parallel to the microphone diaphragm, wherein a first layer of conductive material defines the microphone diaphragm, wherein a second layer of conductive material defines the set of hot-wire extending members, and wherein the base includes a substrate that supports both the first layer of conductive material and the second layer of conductive material.

11. The acoustic sensor of claim 10 wherein the microphone further includes:

a rigid member that is supported by the base and that is substantially parallel to the microphone diaphragm to define a condenser microphone cavity, wherein a third layer of conductive material defines the rigid member of the microphone, wherein the substrate supports the third layer of conductive material, and wherein the microphone diaphragm extends in a contiguous manner to the base to form a seal between the set of hot-wire extending members and the condenser microphone cavity.

12. The acoustic sensor of claim 10 wherein the set of hot-wire extending members includes:

tungsten bridges that are substantially parallel to each other within the plane defined by the set of hot-wire extending members.

13. The acoustic sensor of claim 10, further comprising:

a layer of protective material supported by the substrate, the layer of protective material defining a mesh such that sound waves are capable of passing from an external location to the set of hot-wire extending members and to the microphone diaphragm through the layer of protective material.

14. The acoustic sensor of claim 10 wherein the first layer of conductive material defines multiple microphone diaphragms including the microphone diaphragm, wherein the multiple microphone diaphragms are configured into a two-dimensional N×M array of microphone diaphragms, wherein the second layer of conductive material defines multiple sets of hot-wire extending members including the set of hot-wire extending members, and wherein the multiple sets of hot-wire extending members are configured into a two-dimensional N×M array of sets of hot-wire extending members that corresponds to the two-dimensional N×M array of microphone diaphragms.

15. The acoustic sensor of claim 14 wherein the two-dimensional N×M array of microphone diaphragms includes:

a first microphone diaphragm configured to respond to sound waves within a first frequency range; and a second microphone diaphragm configured to respond to sound waves within a second frequency range that is different than the first frequency range.

16. The acoustic sensor of claim 14 wherein the two-dimensional N×M array of microphone diaphragms includes a first row of microphone diaphragms configured to respond to sound waves within a first frequency range, and a second row of microphone diaphragms configured to respond to sound waves within a second frequency range that is different than the first frequency range.

17. An acoustic system, comprising:

an acoustic sensor having (i) a base, (ii) a microphone having a microphone diaphragm that is supported by the base, and (iii) a hot-wire anemometer having a set of hot-wire extending members that is supported by the base, the set of hot-wire extending members defining a plane which is substantially Parallel to the microphone diaphragm; and a processing circuit that receives a sound and wind pressure signal from the microphone and a wind velocity signal from the hot-wire anemometer, and that provides an output signal based on the sound and wind pressure signal from the microphone and the wind velocity signal from the hot-wire anemometer, wherein the acoustic sensor is a microelectromechanical systems device, wherein a first layer of conductive material defines the microphone diaphragm, wherein a second layer of conductive material defines the set of hot-wire extending members, and wherein the base includes a substrate that supports both the first layer of conductive material and the second layer of conductive material.

18. The acoustic system of claim 17 wherein the microphone of the acoustic sensor further includes:

a rigid member that is substantially parallel to the microphone diaphragm to form a condenser microphone cavity, wherein a third layer of conductive material defines the rigid member of the microphone, wherein the substrate supports the third layer of conductive material, and wherein the microphone diaphragm extends in a contiguous manner to the base to form a seal between the set of hot-wire extending members and the condenser microphone cavity.

19. The acoustic system of claim 17 wherein the set of hot-wire extending members of the hot-wire anemometer of the acoustic sensor includes:

tungsten bridges that are substantially parallel to each other within the plane defined by the set of hot-wire extending members.

20. The acoustic system of claim 17 wherein the acoustic sensor further includes:

a layer of protective material supported by the substrate, the layer of protective material defining a mesh such that sound waves are capable of passing from an external location to the set of hot-wire extending members and to the microphone diaphragm through the layer of protective material.

21. The acoustic system of claim 17 wherein the first layer of conductive material defines multiple microphone diaphragms including the microphone diaphragm, wherein the multiple microphone diaphragms are configured into a two-dimensional N×M array of microphone diaphragms, wherein the second layer of conductive material defines multiple sets of hot-wire extending members including the set of hot-wire extending members, and wherein the multiple sets of hot-wire extending members are configured into a two-dimensional N×M array of sets of hot-wire extending members that corresponds to the two-dimensional N×M array of microphone diaphragms.

22. The acoustic system of claim 21 wherein the two-dimensional N×M array of microphone diaphragms includes:

a first microphone diaphragm configured to respond to sound waves within a first frequency range; and a second microphone diaphragm configured to respond to sound waves within a second frequency range that is different than the first frequency range.

23. The acoustic system of claim 21 wherein the two-dimensional N×M array of microphone diaphragms includes a first row of microphone diaphragms configured to respond to sound waves within a first frequency range, and a second row of microphone diaphragms configured to respond to sound waves within a second frequency range that is different than the first frequency range.

24. The acoustic system of claim 17 wherein the processing circuit includes:

a conversion stage that converts the wind velocity signal from the hot-wire anemometer into an analog wind pressure signal having a wind pressure component; and an output stage that subtracts the wind pressure component of the analog wind pressure signal from the sound and wind pressure signal from the microphone to provide the output signal.

25. The acoustic system of claim 24 wherein the conversion and output stages are analog circuits which reside in an application specific integrated circuit.

* * * * *

UNITED STATES PATENT AND TRADEMARK OFFICE

CERTIFICATE OF CORRECTION

PATENT NO. : 6,688,169 B2
DATED : February 10, 2004
INVENTOR(S) : Howard C. Choe and Emel S. Bulat It is certified that error appears in the above-identified patent and that said Letters Patent is hereby corrected as shown below:

Column 20,
Line 32, "system comprising" should read -- system, comprising --.
Line 33, "having (l) a" should read -- having (i) a --.

Signed and Sealed this

Twenty-second Day of June, 2004

JON W. DUDAS
*Acting Director of the United States Patent and Trademark Office*